US012810380B2

(12) United States Patent
Russell

(10) Patent No.: US 12,810,380 B2
(45) Date of Patent: Nov. 24, 2026

(54) UPDATING VISUAL CHARACTERISTICS OF FRAMES

(71) Applicant: NVIDIA Corporation, Santa Clara, CA (US)

(72) Inventor: Andrew Ian Russell, Weston, FL (US)

(73) Assignee: NVIDIA Corporation, Santa Clara, CA (US)

( * ) Notice: Subject to any disclaimer, the term of this patent is extended or adjusted under 35 U.S.C. 154(b) by 227 days.

(21) Appl. No.: 18/734,949

(22) Filed: Jun. 5, 2024

(65) Prior Publication Data

US 2025/0378525 A1 Dec. 11, 2025

(51) Int. Cl.
*G06T 3/40* (2024.01)
*G06T 7/90* (2017.01)

(52) U.S. Cl.
CPC .................. *G06T 3/40* (2013.01); *G06T 7/90* (2017.01); *G06T 2207/10024* (2013.01)

(58) Field of Classification Search
CPC .... G06T 3/40; G06T 7/90; G06T 2207/10024
See application file for complete search history.

(56) References Cited

U.S. PATENT DOCUMENTS 8,571,346 B2 10/2013 Lin
9,177,368 B2 11/2015 Cabral et al.
9,355,468 B2 * 5/2016 Pajak ........................ G06T 9/00
9,479,709 B2 10/2016 Bokari et al.
9,852,531 B2 * 12/2017 Min .......................... G06T 5/92
9,870,375 B2 1/2018 Wyatt et al.
10,257,449 B2 4/2019 Avadhanam et al.
10,692,191 B2 * 6/2020 Smirnov ................... G06T 5/90
10,992,845 B1 * 4/2021 Seely ................... H04N 5/2226
12,555,284 B2 * 2/2026 Goshen ................... G06T 11/00
(Continued)

OTHER PUBLICATIONS

Huang, D., Wang, Y., Song, W., Sequeira, J., Mavromatis, S. (2018). Shallow-Water Image Enhancement Using Relative Global Histogram Stretching Based on Adaptive Parameter Acquisition. In: Schoeffmann, K., et al. MultiMedia Modeling. MMM 2018. Lecture Notes in Computer Science, vol. 10704 Springer, Cham (Year: 2018).*

(Continued)

*Primary Examiner* — Ian L Lemieux
*Assistant Examiner* — Noah William Boyar
(74) *Attorney, Agent, or Firm* — IRON SUMMIT IP LLP

(57) ABSTRACT

In various examples, updating visual characteristics of frames for content streaming systems and applications is described herein. Systems and methods are disclosed that use one or more minimum and/or maximum color values associated one or more color channels to update color values associated with points (e.g., pixels) of frames in order to improve one or more visual characteristics (e.g., increase contrast etc.) associated with the frames. For instance, and for at least a portion of a frame, in some examples, a minimum color value and/or a maximum color value associated with the color channels may be used to "stretch" the color values associated with the points, such as by decreasing at least a portion of the color values and/or increasing another portion of the color values. Additionally, in some examples, average color values and/or factors may be used to further update the color values.

20 Claims, 16 Drawing Sheets

(56) References Cited

U.S. PATENT DOCUMENTS

| | | | | |
|---|---|---|---|---|
| 2007/0188623 | A1* | 8/2007 | Yamashita | G06T 5/40 348/222.1 |
| 2007/0206854 | A1* | 9/2007 | Stahlke | G06T 5/40 382/254 |
| 2014/0086485 | A1* | 3/2014 | Min | G06T 5/92 382/172 |
| 2015/0296193 | A1* | 10/2015 | Cote | G06T 3/4015 382/167 |
| 2015/0332444 | A1* | 11/2015 | Tsuda | G06T 5/40 382/167 |
| 2020/0320748 | A1* | 10/2020 | Levinshtein | G06N 3/08 |
| 2021/0360179 | A1* | 11/2021 | Dangi | G06N 3/084 |
| 2022/0245774 | A1* | 8/2022 | Yu | G06T 5/92 |
| 2022/0366607 | A1* | 11/2022 | Bojan | G06T 7/90 |
| 2022/0383508 | A1* | 12/2022 | Liu | G06V 10/82 |
| 2023/0186429 | A1* | 6/2023 | Norouzzadeh | G06T 3/4046 |
| 2023/0199339 | A1* | 6/2023 | Hua | G06T 3/4015 348/242 |
| 2023/0306569 | A1* | 9/2023 | Hong | G06T 3/40 |
| 2024/0233187 | A1* | 7/2024 | Spiker | G01J 3/42 |
| 2024/0312086 | A1* | 9/2024 | Goshen | G06T 11/00 |
| 2025/0110126 | A1* | 4/2025 | Gao | G06T 5/94 |
| 2025/0111482 | A1* | 4/2025 | Fujiwara | G06T 5/60 |
| 2026/0010992 | A1* | 1/2026 | Touze | G06T 5/92 |
| 2026/0019577 | A1* | 1/2026 | Esenlik | H04N 19/117 |
| 2026/0067581 | A1* | 3/2026 | Kim | H04N 23/71 |

OTHER PUBLICATIONS

Wang, Q., Fu, B., Fan, H.: Underwater image enhancement via a channel-wise transmission estimation network. IET Image Process. 17, 2958-2971 (2023) (Year: 2023).*

Xiao, Ziyuan, et al. "Usln: A statistically guided lightweight network for underwater image enhancement via dual-statistic white balance and multi-color space stretch." arXiv preprint arXiv:2209.02221 (2022) (Year: 2022).*

Limare, Nicolas, et al. "Simplest color balance." Image Processing on Line 1 (2011): 297-315. (Year: 2011).*

* cited by examiner

UPDATING VISUAL CHARACTERISTICS OF FRAMES

BACKGROUND

For some gaming applications, the success of a player may be based on the player's reaction time, such as the time it takes for the player to observe what events are occurring with regard to a gaming application, process the events to determine how to respond, and then react with the determined response. Currently, there are many factors that may contribute to the player's reaction time, such as visual characteristics associated with the frames being presented to the player. For instance, the contrast, brightness, saturation, and/or other visual characteristics of the frames may affect the player's reaction time. For example, if the visual characteristics include higher contrast, brightness, and/or saturation, then the player's reaction time may decrease as the player may more easily observe and process the events. However, if the visual characteristics include lower contrast, brightness, and/or saturation, then the player's reaction time may increase as it may be more difficult for the player to observe and/or process the events.

As such, some conventional systems may allow for players to set levels for various visual characteristics associated with gaming applications. For instance, a player may set a contrast level, a brightness level, and/or a saturation level that the conventional systems may then use when processing frames of a gaming application. For example, if the player increases the contrast level, the brightness level, and/or the saturation level, then the conventional systems may update the visual characteristics of the frames by increasing the contrast, the brightness, and/or the saturation. However, in some circumstances, while applying updates to visual characteristics for some frames may decrease the reaction times for players, the same static updates to visual characteristics of other frames may have the opposite effect of increasing reaction times. This is because the same static updates may cause events to be easier to observe in some frames while also causing events to be more difficult to observe in other frames.

SUMMARY

Embodiments of the present disclosure relate to updating visual characteristics of frames for content streaming systems and applications. Systems and methods are disclosed that use one or more minimum (lower bound or lower extreme) and/or maximum (upper bound or upper extreme) color values associated one or more color channels to update color values associated with points (e.g., pixels) of frames in order to improve one or more visual characteristics (e.g., increase contrast, increase saturation, increase brightness, etc.) associated with the frames. For instance, and for at least a portion of a frame, in some examples, a minimum color value and/or a maximum color value associated with the color channels may be used to "stretch" the color values associated with the points, such as by decreasing at least a portion of the color values and/or increasing another portion of the color values. Additionally, in some examples, additional processes may be performed to further update the color values in order to better increase the color characteristic(s). For a first example, a minimum color value associated with one or more (e.g., each) of the maximum color values may be used to further stretch the color values, such as by further decreasing the color values. For a second example, average color values associated with the color channels, which may be weighted, may be used to stretch the color values, such as by further decreasing at least a portion of the color values and/or increasing another portion of the color values by a factor.

In contrast to conventional systems, such as those described above, the system of the present disclosure may dynamically update color values associated with frames in order to improve the visual characteristic(s) associated with the frames. For instance, and as discussed above, the conventional systems may apply the same, static changes (e.g., levels) for visual characteristics to all frames, which may decrease the reaction times for some frames, but may also increase the reaction times for other frames when associated with gaming applications. In contrast, by dynamically updating the color values to improve the visual characteristic(s), such as by using various minimum and/or maximum color values for individual frames, the individual frames and/or groups of frames may be updated in order to maximize the visual characteristic(s) of the frames. In this matter, luminance of colors may be amplified (e.g., brighter colors become even brighter and darker colors become even darker). As will be described in more detail herein, this may reduce (e.g., minimize) the reaction times for at least a majority (e.g., all) of the frames, such as when the frames are associated with gaming applications.

BRIEF DESCRIPTION OF THE DRAWINGS

The present systems and methods for updating visual characteristics of frames for content streaming systems and applications are described in detail below with reference to the attached drawing figures, wherein.

DETAILED DESCRIPTION

Figure 1:
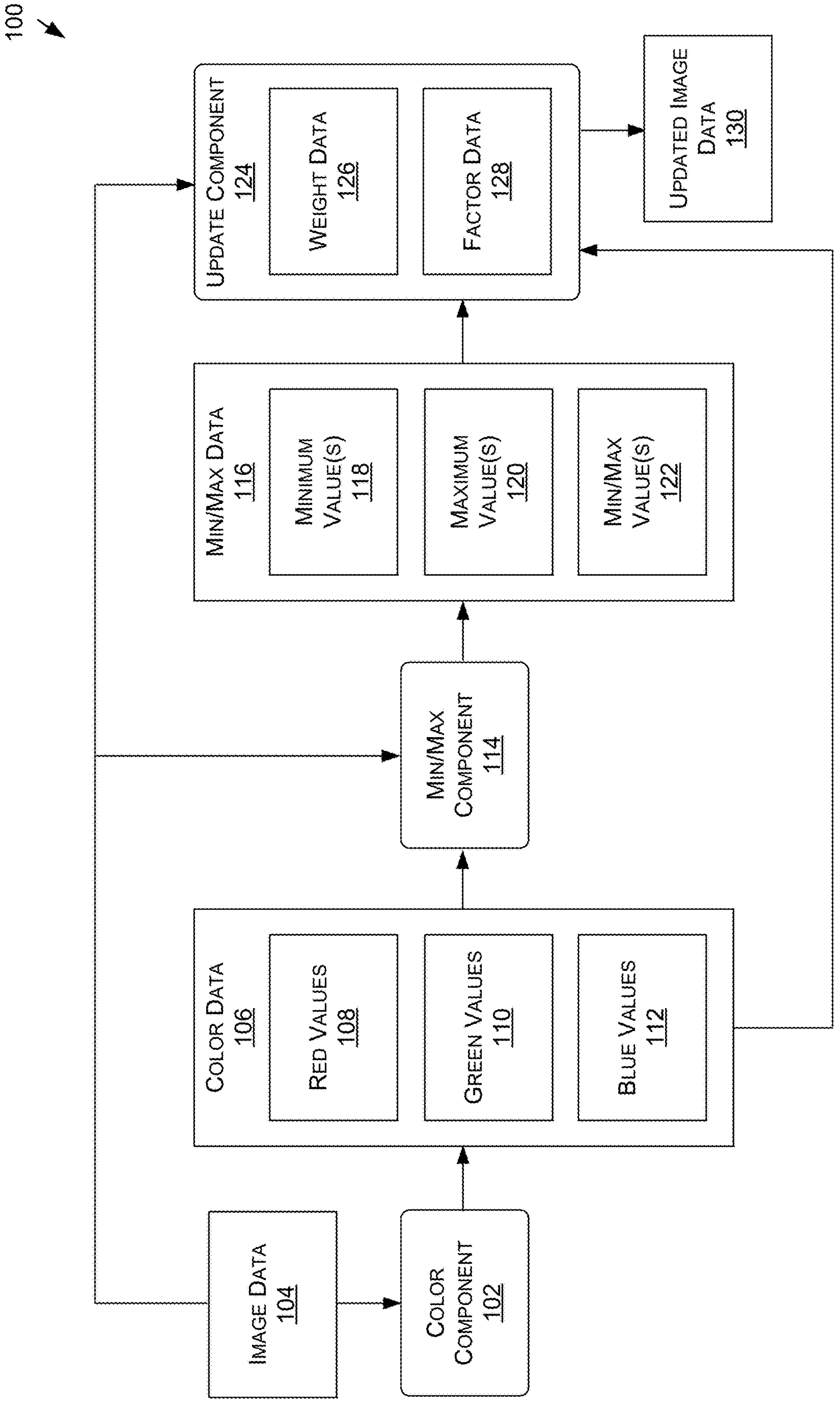
FIG. 1 illustrates an example of a process of using various color values to update visual characteristics of frames, in accordance with some embodiments of the present disclosure.

Systems and methods disclosed herein relate to updating visual characteristics of frames for content streaming systems and applications. For instance, a system(s) may host a session of an application with a client device. As described herein, an application may include, but is not limited to, a gaming application, an interactive application (which may include one or more of these other types of applications), a visual application (which may include one or more of these other types of applications), a multimedia application (e.g., a video streaming application, a music streaming application, a voice streaming application, a multimedia streaming application that includes both audio and video, etc.), a communications application (e.g., a video conferencing application, etc.), an educational application, a collaborative content creation application, an entertainment application (e.g., a show, a movie, etc.), or any other type of application. For instance, during the session, the client device may generate input data representing one or more inputs received from the user via one or more input devices. The system(s) may then receive the input data from the client device, use the input data to update a state of the application, and then send content data (e.g., image data, audio data, etc.) representing the current state of the application back to the client device. Using the content data, the client device may then provide the content to the user, such as by displaying one or more frames depicting the current state and/or outputting sound associated with the current state.

As described herein, the system(s) may process the image data in order to improve one or more visual characteristics associated with the frames, such as by increasing the contrast, the brightness, the saturation, and/or the like. For instance, the system(s) may determine color values for color channels associated with at least a portion of a frame. As described herein, the color values may include at least red color values for a red color channel, green color values for a green color channel, and blue color values for a blue color channel. Additionally, the system(s) may determine the color values using any type of color space, such as the red-green-blue (RGB) color space, the YUV color space, and/or so forth. As such, the color values may be associated with a range, such as a range between 0 and 1.0 (e.g., in the YUV color space), a range between 0 and 255 (e.g., in the RGB color space), and/or any other range. As such, when describing set color values, a set minimum color value may thus include the lowest end of the range (e.g., 0) and a set maximum color value may include the highest end of the range (e.g., 1.0 or 255).

The system(s) may then determine one or more minimum (lower bound or lower extreme) color values and/or one or more maximum (upper bound or upper extreme) color values associated with the color values. For instance, the system(s) may determine a minimum color value for points (e.g., pixels) included in the portion of the frame, a maximum color value for the points, maximum color values across multiple (e.g., all) of the points, a minimum color value associated with the maximum color values across the multiple points (also referred to as the "min/max color value"), and/or any other minimum and/or maximum color value. As will be described in more detail herein, in some examples, the system(s) may determine the minimum and/or maximum color values based at least on processing the color values for the color channels. For example, the system(s) may determine the maximum color value for the points as the greatest color value from among all of the color values for the color channels. Additionally, or alternatively, in some examples, the system(s) may determine the minimum and/or maximum color values as "local" color values, such as by processing the frame using various techniques (e.g., downsampling, upsampling, filtering, etc.).

The system(s) may then use one or more techniques to update the color values based at least on one or more of the minimum or maximum color values. For instance, and for a first technique, the system(s) may use the minimum color value associated with the points included in the portion of the frame and the maximum color value associated with the points included in the portion of the frame to "stretch" the color signal associated with the portion of the frame. For example, the system(s) may decrease the minimum color value, such as to the set minimum color value associated with the color channels (e.g., 0) in order to increase a saturation, while also increasing the maximum color value, such as to the set maximum color value associated with the color channels (e.g., 1.0) in order to increase a contrast. By performing this decreasing and increasing, the system(s) may further decrease at least a portion of the color values while also increasing at least another portion of the color values to determine updated color values. As will be described in more detail herein, the amounts of decreasing and/or increasing of the color values may depend on one or more factors, such as how close the color values are to the minimum color value and/or maximum color value.

Additionally, or alternatively, for a second technique, the system(s) may use the minimum color value for the points included in the portion of the frame, the maximum color value associated with the points included in the portion of the frame, and the min/max color value to again "stretch" the color signal associated with the portion of the frame. For example, the system(s) may perform similar processes as the first technique to update the color values for the color channels. However, the system(s) may then further decrease the min/max color value, such as to the set minimum color value. By performing this second decrease, the system(s) may further decrease at least a portion of the color values (e.g., the maximum color values) in order to further increase the contrast associated with the portion of the frame. As will be described in more detail herein, when performing this second decrease, the system(s) may use one or more factors associated with one or more points in order to maintain color ratios between the color values for the color channels at the points of the frame.

Additionally, or alternatively, for a third technique, the system(s) may use the maximum color value for the points included in the portion of the frame and the min/max color value to again "stretch" the color signal associated with the portion of the frame. For example, the system(s) may increase the maximum color value, such as to the set maximum color value associated with the color channels (e.g., 1.0), while also decreasing the min/max color value, such as to the set minimum color value associated with the color channels (e.g., 0). By performing this increasing and decreasing, the system(s) may further increase at least a portion of the color values while also decreasing at least another portion of the color values to determine updated color values. In some examples, the system(s) may perform this stretching similar to the other techniques, such as by maintaining at least a portion of the ratios between the color values.

The system(s) may then determine average color values associated with the points of the frame using the updated color values. For example, and for a point, the system(s) may determine an average color value using the red color value, a weight associated with the red color value, the green color value, a weight associated with the green color value, the blue color value, and/or a weight associated with the blue color value. The system(s) may then further update the color values using the average color values along with a factor, such as 1, 1.5, 2, 2.5, 3, and/or any other factor. For instance, the system(s) may further decrease at least a portion of the color values and/or increase at least an additional portion of the color values using the average color values and the factor. For example, and for a point, the system(s) may determine distances between the color values associated with the point and the average color value associated with the point and then multiply the distances by the factor. The system(s) may then perform similar processes for one or more (e.g., each) of the other points associated with the portion of the frame.

Additionally, in some examples, since this further updating of the color values may cause one or more of the color values to fall outside of the range of color values, such as by being less than the set minimum color value (e.g., 0) or greater than the set maximum color value (e.g., 1.0), the system(s) may further "clip" those color value(s) that are outside of the range of color values. For example, the system(s) may cause any color value that is less than the set minimum color value to include the set minimum color value or cause any color value that is greater than the set maximum color value to include the set maximum color value. This way, all of the color values for the color channels may fall within the range of color values.

As described herein, in some examples, the system(s) may perform these processes with respect to a portion of the frame, such as a row of pixels of the frame. As such, the system(s) may perform similar processes to update the color values associated with one or more (e.g., each) of the additional portions of the frame. Additionally, in some examples, the system(s) may perform similar processes for one or more (e.g., each) of the additional frames represented by the image data. As such, by performing these processes, the system(s) may dynamically update the visual characteristics associated with the frames, such as by increasing the contrast, the brightness, and/or the saturation associated with the frames. Increasing the visual characteristics using such techniques has numerous advantages including increasing user engagement and attention. For instance, in the context of interactive applications, reaction times associated with a user of the application may decrease.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems implementing vision language models (VLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example of a process 100 of using various color values to update visual characteristics of frames, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include a color component 102 receiving image data 104, where the image data 104 represents one or more frames associated with an application. For instance, one or more application servers (e.g., an application server(s) 1102) may be providing the application to one or more client devices (e.g., a client device 1104). As described herein, the application may include, but is not limited to, a gaming application, an interactive application, a visual application, a multimedia application (e.g., a video streaming application, a music streaming application, a voice streaming application, a multimedia streaming application that includes both audio and video, etc.), a communications application (e.g., a video conferencing application, etc.), an educational application, a collaborative content creation application, an entertainment application (e.g., a show, a movie, etc.), or any other type of application. As such, the application server(s) may generate and then send the image data 104 for output by the client device. However, in order to update visual characteristics associated with the frames, such as to help reduce the reaction time of one or more users associated with the application, the application server(s) and/or the client device may process the image data 104 using one or more of the processes described herein.

For instance, and for a frame, the process 100 may include the color component 102 processing the image data 104 representing at least a portion the frame and, based at least on the processing, generating color data 106 representing color values for color channels. As described herein, the color values may include at least red color values 108 for a red color channel, green color values 110 for a green color channel, and blue color values 112 for a blue color channel. Additionally, in some examples, the color component 102 may determine color values using any type of color space, such as the red-green-blue (RGB) color space, the YUV color space, and/or so forth. As such, the color values may be associated with a range, such as a range between 0 and 1.0 (e.g., in the YUV color space), a range between 0 and 255 (e.g., in the RGB color space), and/or any other range. In some examples, the color component 102 may determine the color values associated with one or more portions associated with the frame, such as one or more rows of points (e.g., pixels, groups of pixels, etc.), one or more columns of points, and/or one or more areas of points associated with the frame.

Figure 2:
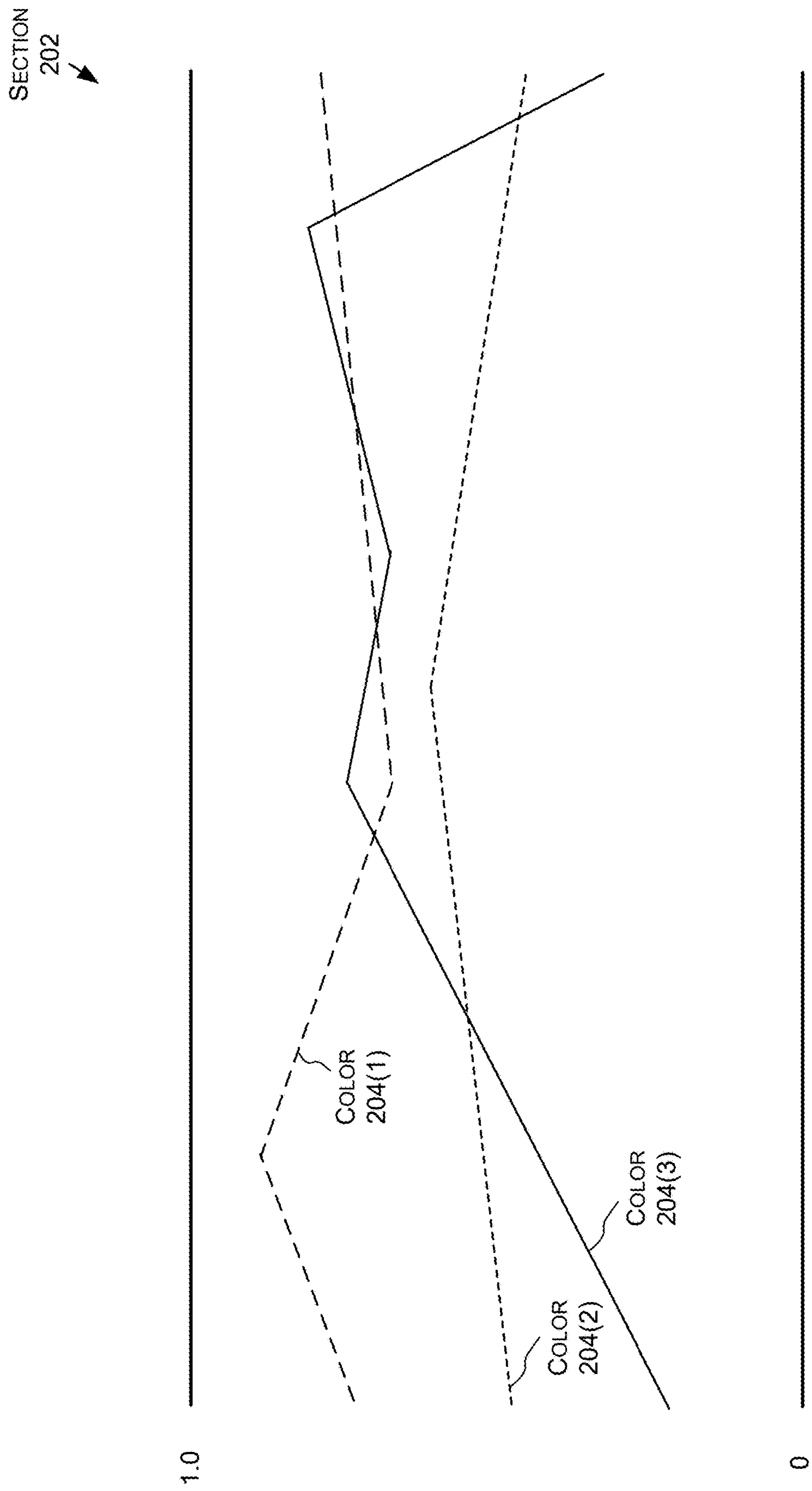
FIG. 2 illustrates an example of determining color values associated with at least a portion of a frame, in accordance with some embodiments of the present disclosure.

For instance, FIG. 2 illustrates an example of determining color values associated with at least a portion of a frame, in accordance with some embodiments of the present disclosure. As shown, the color component 102 may determine color values associated with a cross-section 202 portion of the frame, such as a row of points associated with the frame. In the example of FIG. 2, the color component 102 may determine at least first color values 204(1) for a first color channel, second color values 204(2) for a second color channel, and third color values 204(3) for a third color channel. As described herein, the color channels may include, but are not limited to, a red color channel, a green color channel, a blue color channel, and/or any other color channel.

As further illustrated, the color component 102 may determine the color values 204(1)-(3) as being within a range of values. While the example of FIG. 2 illustrates the color component 102 as determining the color values 204(1)-(3) as being within a range between 0 to 1.0, in other examples, the color component 102 may determine the color values 204(1)-(3) between another range, such as between 0 and 255.

Referring back to the example of FIG. 1, the process 100 may include a min/max component 114 processing at least a portion of the color data 106 and/or the image data 104 and, based at least on the processing, generating min/max data 116 representing one or more minimum color values and/or one or more maximum color values associated with the portion of the frame. As described herein, the min/max component 114 may determine a minimum color value 118 for points (e.g., pixels) included in the portion of the frame, a maximum color value 120 for the points, maximum color values 120 across multiple (e.g., all) of the points, a minimum color value associated with the maximum color values 120 across the multiple points (also referred to as a "min/max color value 122"), and/or any other minimum and/or maximum color value.

Figure 3:
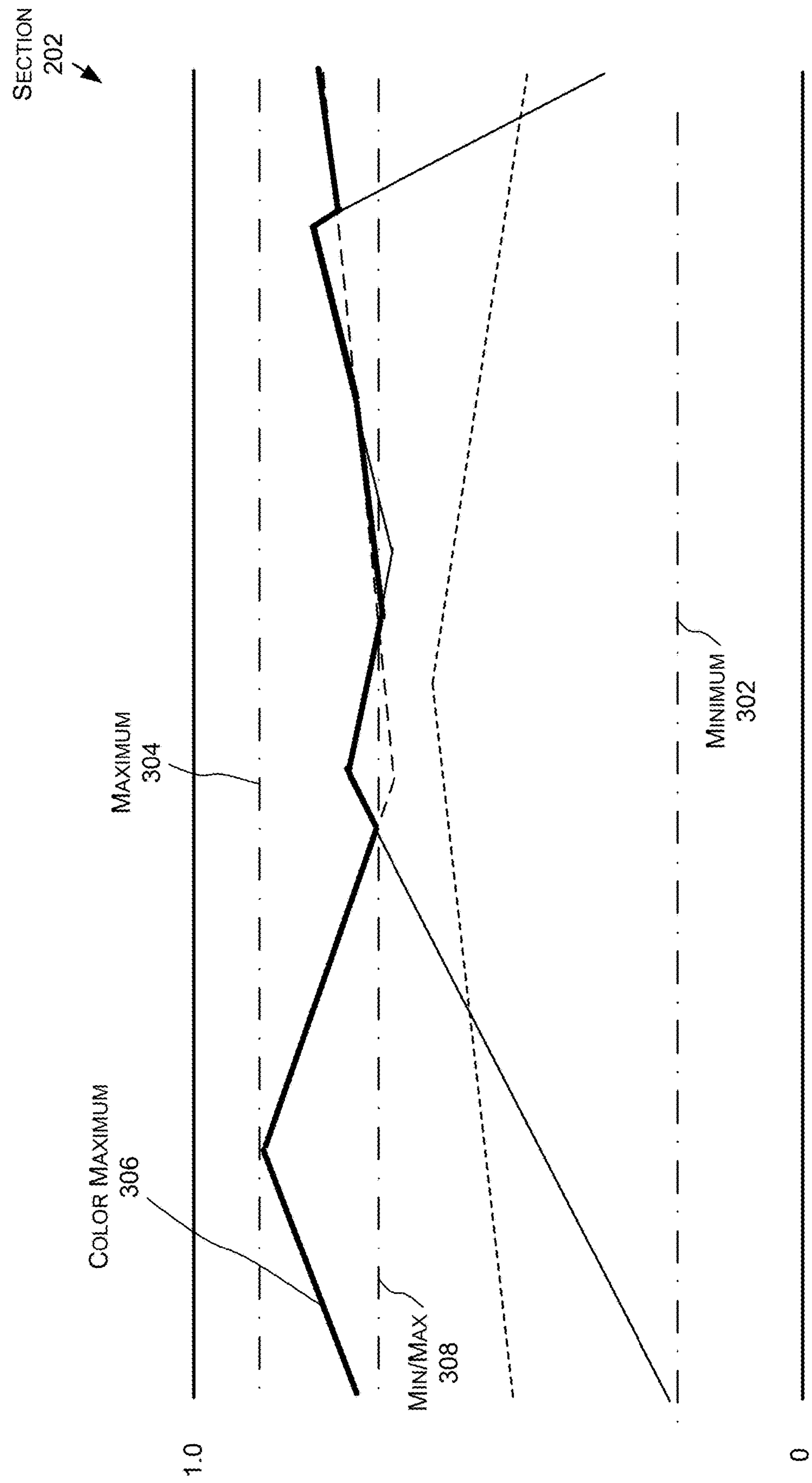
FIG. 3 illustrates an example of minimum color values and/or maximum color values associated with at least a portion of a frame, in accordance with some embodiments of the present disclosure.

For instance, FIG. 3 illustrates an example of minimum color values and/or maximum color values associated with at least a portion of a frame, in accordance with some embodiments of the present disclosure. As shown, the min/max component 114 may determine, for the cross-section 202 portion of the frame, at least a minimum color value 302 associated with the color values 204(1)-(3) and at a point, a maximum color value 304 associated with the color values 204(1)-(3) and at a point, maximum color values 306 associated with the color values 204(1)-(3) and at the points, and a min/max color value 308 associated with the maximum color values 306. However, in other examples, the min/max component 114 may determine one or more additional minimum color values and/or one or more additional maximum color values associated with the cross-section 202 of the frame. Additionally, in some examples, the min/max component 114 may not determine one or more of the minimum color values 302, the maximum color value 304, the maximum color values 306, and/or the min/max color value 308.

Referring back to the example of FIG. 1, and as described herein, the min/max component 114 may use one or more techniques to determine the minimum color value(s) and/or the maximum color value(s). For instance, in some examples, the min/max component 114 may determine the minimum color value(s) and/or the maximum color value(s) using the actual color values as represented by the color data 106. For example, the min/max component 114 may determine the minimum color value 118 as the lowest color value among the color values (e.g., the red color values 108, the green color values 110, and the blue color values 112) and at a point, the maximum color value 120 as the highest color value from among the color values and at a point, the maximum color values 120 as the highest color values from among the color values and at multiple points (e.g., every point), and the min/max color value 122 as the lowest color value among the maximum color values 120.

Additionally, or alternatively, in some examples, the min/max component 114 may determine one or more local minimum color values and/or one or more local maximum color values associated with the portion of the frame. For instance, and using a pyramid type technique, the min/max component 114 may downsample the frame by a factor and over one or more iterations. As described herein, the factor may include, but is not limited to, two, four, six, eight, and/or any other factor. Additionally, the number of iterations may include, but is not limited to, one iteration, two iterations, three iterations, five iterations, ten iterations, and/or any other number of iterations. As such, based at least on performing the downsampling, the min/max component 114 may generate a number of downsampled frames that are associated with the original frame, but with lower resolutions. For instance, if the factor is two, then the min/max component 114 may generate at least a first downsampled frame that includes a resolution that is half of the original frame, a second downsampled frame that includes a resolution that is half of the first downsampled frame, a third downsampled frame that includes a resolution that is half of the second downsampled frame, and/or so forth.

The min/max component 114 may then upsample the frames by a factor and over a number of iterations. In some examples, the factor used in upsampling may the same as the factor used in downsampling and/or the number of iterations used in upsampling may include the number of iterations used in downsampling. In some examples, while performing the upsampling, the min/max component 114 may further perform a local maximum operation by dilation and then use a filter (e.g., a box filter, etc.) to give a smooth function. For instance, the min/max component 114 may perform a 2×2 dilation, a 4×4 dilation, a 6×6 dilation, and/or any other type of dilation, and/or the min/max component 114 may use a 2×2 filter, a 4×4 filter, a 6×6 filter, and/or any other type of filter. In such examples, the result of the smooth function may provide a local maximum color value 120 associated with at least the portion of the frame. In some examples, the local maximum color value may fall by a given amount, such as 1/r.

Figure 4:
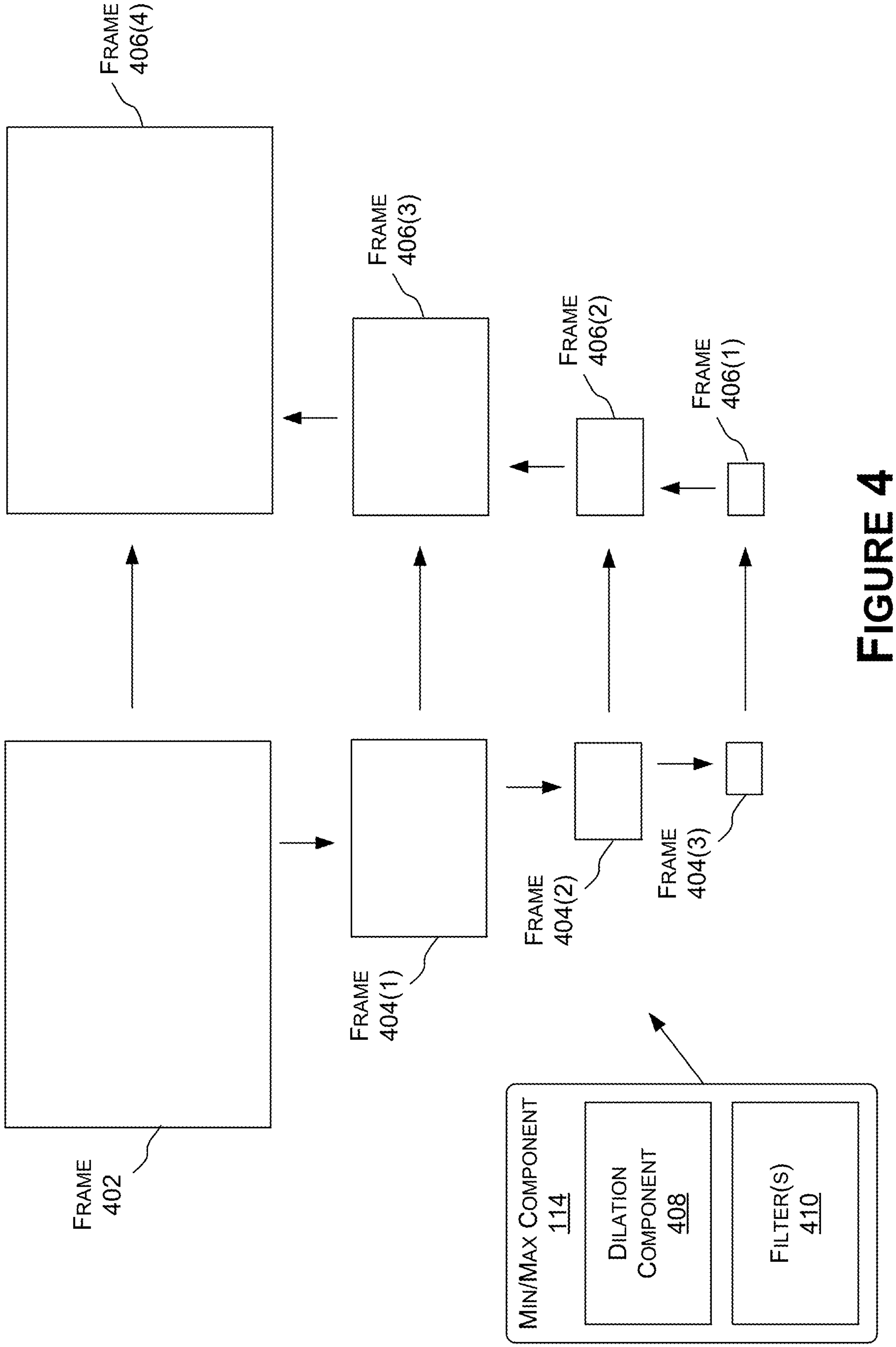
FIG. 4 illustrates an example of sampling a frame in order to determine a local maximum color value associated with at least a portion of the frame, in accordance with some embodiments of the present disclosure.

For instance, FIG. 4 illustrates an example of sampling a frame in order to determine a local maximum color value associated with at least a portion of the frame, in accordance with some embodiments of the present disclosure. As shown, the min/max component 114 may initially receive image data (e.g., image data 104) representing a frame 402. In some examples, the cross-section 202 may be associated with at least a portion of the frame 402. The min/max component 114 may then perform downsampling with regard to the frame 402 using a factor and over a number of iterations. In the example of FIG. 4, the factor may include two and the number of iterations may include three. As such, the min/max component 114 may downsample the frame 402 in order to generate a first downsampled frame 404(1) that includes a resolution that is less than a resolution of the frame 402, downsample the first downsampled frame 404(1) in order to generate a second downsampled frame 404(2) that includes a resolution that is less than the resolution of the first downsampled frame 404(1), and downsample the second downsampled frame 404(2) in order to generate a third downsampled frame 404(3) that includes a resolution that is less than the resolution of the second downsampled frame 404(2).

Additionally, the min/max component 114 may then perform upsampling using the downsampled frames 404(1)-(3) and/or the frame 402 using a factor and over a number of iterations. In the example of FIG. 4, the factor may include two and the number of iterations may include three. As such, the min/max component 114 may upsample a first upsampled frame 406(1) (which may include the third downsampled frame 404(3)) in order to generate a second upsampled frame 406(2) that includes a resolution that is greater than a resolution of the first upsampled frame 406(1), upsample the second upsampled frame 406(2) in order to generate a third upsampled frame 406(3) that includes a resolution that is greater than the resolution of the second upsampled frame 406(2), and upsample the third upsampled frame 406(3) in order to generate a fourth upsampled frame 406(4) that includes a resolution that is greater than the resolution of the third upsampled frame 406(3).

Additionally, the upsampled frames 406(2)-(4) may be based on other upsampled frames 406(1)-(3) with lower resolution or on the downsampled frames 404(1)-(3) at the same resolution or a combination of these both. For a first example, the second upsampled frame 406(2) may be generated from a combination of the first upsampled frame 406(1) and the second downsampled frame 404(2). For a second example, the third upsampled frame 406(3) may be generated from a combination of the second upsampled frame 406(2) and the first downsampled frame 404(1). In some examples, the combining step can be averaging, or weighted averaging or other form of combining.

As described herein, when performing the sampling, the min/max component 114 may use a dilation component 408 to perform a local maximum operation by dilation and then use one or more filters 410 to give a smooth function, such as at one or more of the iterations. For example, the min/max component 114 may perform the local maximum operation by dilation and then may use any one or more of the filters 410 to give the smooth function at one or more of the iterations associated with upsampling. By performing such processes, the min/max component 114 may determine a maximum color value associated with at least a portion of the frame 402. For example, the min/max component 114 may determine the maximum color value 304. However, in other examples, the min/max component 114 may perform similar processes to determine one or more local minimum color values.

Referring back to the example of FIG. 1, the process 100 may include an update component 124 using one or more techniques to update the color values based at least on one or more of minimum and/or maximum color values. For instance, and for a first technique, the update component 124 may use the minimum color value 118 associated with the points included in the portion of the frame and the maximum color value 122 associated with the points included in the portion of the frame to "stretch" the color signal associated with the portion of the frame. For example, the update component 124 may decrease the minimum color value 118, such as to a set minimum color value associated with the color channels (e.g., 0), while also increasing the maximum color value 120, such as to a set maximum color value associated with the color channels (e.g., 1.0). By performing this decreasing and increasing, the update component 124 may further decrease at least a portion of the color values while also increasing at least another portion of the color values to determine updated color values. As will be described in more detail herein, the amounts of decreasing and/or increasing of the color values may depend on one or more factors, such as how close the color values are to the minimum color value 118 and/or the maximum color value 120.

Figure 5:
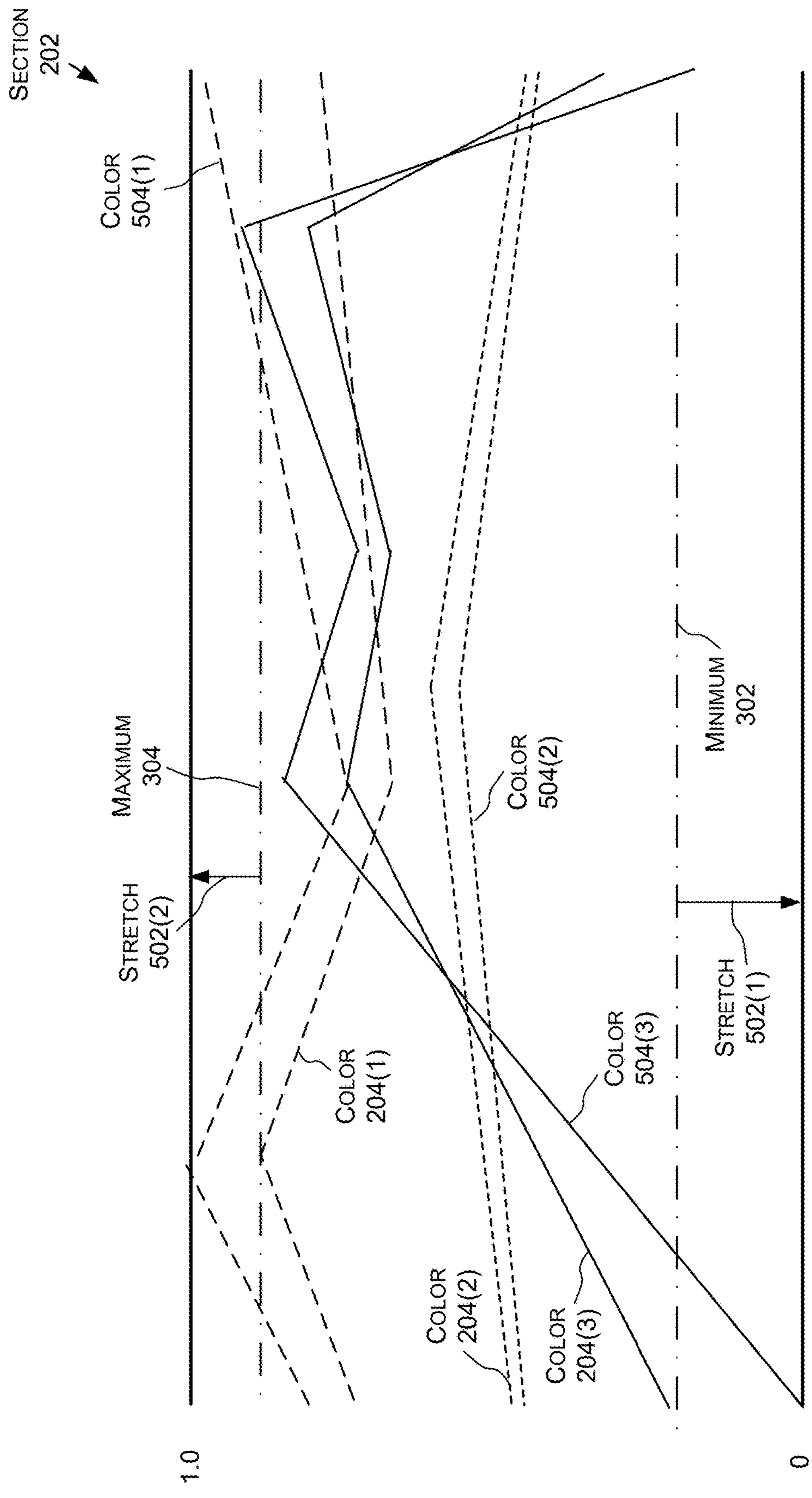
FIG. 5 illustrates an example of updating color values associated with a portion of a frame using a first technique, in accordance with some embodiments of the present disclosure.

For instance, FIG. 5 illustrates an example of updating color values associated with a portion of a frame using a first technique, in accordance with some embodiments of the present disclosure. As shown, to perform the first technique, the update component 124 may perform a first stretch 502(1) associated with decreasing the minimum color value 302 to include the set minimum color value of 0 and also perform a second stretch 502(2) in order to increase the maximum color value 304 to include the set maximum color value of 1.0. Additionally, based at least on performing the stretching 502(1)-(2), the update component 124 may update the color values 204(1) to determine updated color values 504(1) for the first color channel, update the color values 204(2) to determine updated color values 504(2) for the second color channel, and update the color values 204(3) to determine updated color values 504(3) for the third color channel. As described herein, in some examples, the amounts that the color values 204(1)-(3) are updated may be based on one or more factors, such as the proximity of the color values 204(1)-(3) to the minimum color value 302 and/or the maximum color value 304.

For instance, in some examples, color values 204(1)-(3) that are located closer to the minimum color value 302 as compared to the maximum color value 304 may be increased, color values 204(1)-(3) that are located equally between the minimum color value 302 and the maximum color value 304 may remain the same, and/or color values 204(1)-(3) that are located closer to the maximum color value 304 as compared to the minimum color value 302 may be increased. Additionally, in some examples, the closer a color value 204(1)-(3) is to the minimum color value 302, the more the color value 204(1)-(3) may be decreased and/or the closer a color value 204(1)-(3) is to the maximum color value 304, the more the color value 204(1)-(3) may be increased. For example, a color value 204(1)-(3) located on the minimum color value 302 may be decreased by a greatest amount (e.g., to the set minimum color value), a color value 204(1)-(3) located on the maximum color value 304 may be increased by a greatest amount (e.g., to the set maximum color value), a color value 204(1)-(3) located equally between the minimum color value 302 and the maximum color value 304 may remain the same, and linear interpolation may be used to determine how much to decrease and/or increase other color values 204(1)-(3).

Referring back to the example of FIG. 1, and for a second technique, the update component 124 may use the minimum color value 118 associated with the points included in the portion of the frame, the maximum color value 120 associated with the points included in the portion of the frame, and the min/max color value 122 to again "stretch" the color signal associated with the portion of the frame. For example, the update component 124 may perform similar processes as the first technique to update the color values for the color channels. However, the update component 124 may then further decrease the min/max color value 122, such as to the set minimum color value. By performing this second decrease, the update component 124 may further decrease at least a portion of the color values in order to increase a saturation associated with the portion of the frame. As will be described in more detail herein, when performing this second decrease, the update component 124 may use one or more factors associated with one or more points in order to maintain color ratios between the color values for the color channels and at the points of the frame.

Figure 6:
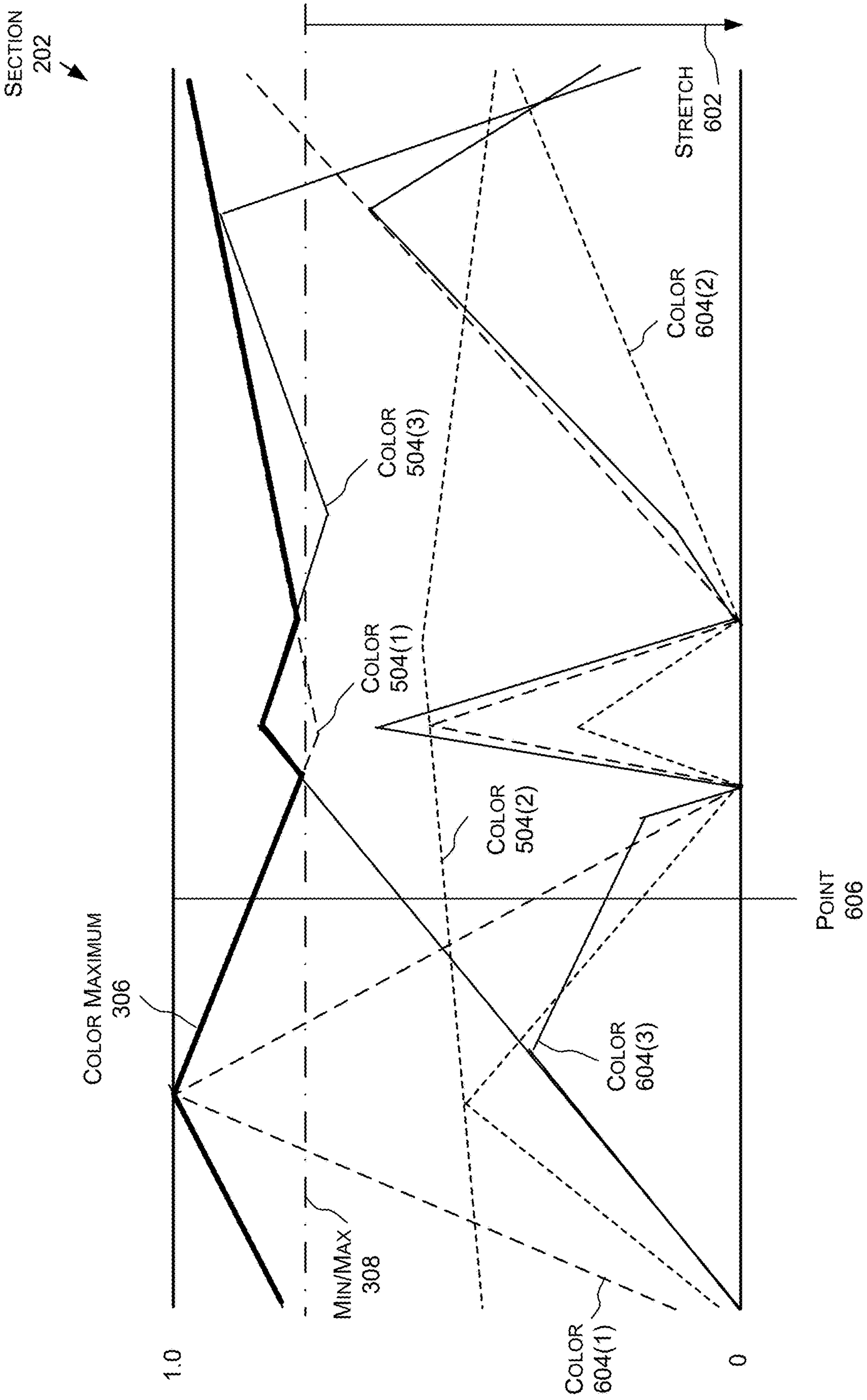
FIG. 6 illustrates an example of updating color values associated with a portion of a frame using a second technique, in accordance with some embodiments of the present disclosure.

For instance, FIG. 6 illustrates an example of updating color values associated with a portion of a frame using a second technique, in accordance with some embodiments of the present disclosure. As shown, after determining the updated color values 504(1)-(3) using the processes described with respect to FIG. 5, the update component 124 may perform another stretch 602 associated with decreasing the min/max color value 308 to include the set minimum color value of 0. Additionally, based at least on performing the stretch 602, the update component 124 may update the color values 504(1) to determine updated color values 604(1) for the first color channel, update the color values 504(2) to determine updated color values 604(2) for the second color channel, and update the color values 504(3) to determine updated color values 604(3) for the third color channel. As described herein, in some examples, the update component 124 may update the color values 504(1)-(3) such that the updated color values 604(1)-(3) include similar ratios as the color values 504(1)-(3).

For instance, and for a point (e.g., a pixel) associated with an indicated line 606, the update component 124 may determine a factor to multiply to the color values 504(1)-(3) associated with the point. In some examples, the update component 124 may determine the factor based at least on a location of the maximum color value 306 with respect to the min/max color value 308 and/or the set maximum color value. For instance, if the maximum color value 306 is at the min/max color value 308, then the factor may include a minimum value, such as zero (and/or any other number). Additionally, if the maximum color value 306 is at the set maximum color value, then the factor may include a maximum value, such as 1.0 (and/or any other number). Furthermore, if the maximum color value 306 is between the min/max color value 308 and the set maximum color value, then the factor may be between the minimum value and the maximum value, such as between 0 and 1.0. In some examples, the factor may be based on a distance between the maximum color value 306 and the min/max color value 308 and/or a distance between the maximum color value 306 and the set maximum color value, such as by using interpolation. For example, if the maximum color value 306 is halfway between the min/max color value 308 and the set maximum color value, then the factor may be halfway between the minimum value and the maximum value, such as 0.5.

The update component 124 may then multiply the color value 504(1) at the point by the factor to determine the updated color value 604(1) at the point, multiply the color value 504(2) at the point by the factor to determine the updated color value 604(2) at the point, and multiply the color value 504(3) at the point by the factor to determine the updated color value 604(3) at the point. As such, since each of the color values 504(1)-(3) at the point are updated by the same factor, then the ratios between the updated color values 604(1)-(3) should remain similar to the ratios between the color values 504(1)-(3) at the point. The update component 124 may then perform similar processes for color values 504(1)-(3) associated with one or more (e.g., each) of the points associated with the cross-section 202.

Referring back to the example of FIG. 1, and for a third technique, the update component 124 may use the maximum color value 120 for the points included in the portion of the frame and the min/max color value 122 to again "stretch" the color signal associated with the portion of the frame. For example, the update component 124 may increase the maximum color value 120, such as to the set maximum color value associated with the color channels (e.g., 1.0), while also decreasing the min/max color value 122, such as to the set minimum color value associated with the color channels (e.g., 0). By performing this increasing and decreasing, the update component 124 may further increase at least a portion of the color values while also decreasing at least another portion of the color values to determine updated color values. In some examples, the update component 124 may perform this stretching similar to the other techniques, such as by maintaining ratios between the color values.

The update component 124 may then determine average color values associated with the points of the frame using the updated color values. For example, and for a point, the update component 124 may determine an average color value using the red color value 108, a weight associated with the red color value 108, the green color value 110, a weight associated with the green color value 110, the blue color value 112, and/or a weight associated with the blue color value 112, where the weights may be represented by the weight data 126. The update component 124 may then further update the color values using the average color values along with a factor represented by factor data 128, such as 1, 1.5, 2, 2.5, 3, and/or any other factor. For instance, the update component 124 may further decrease at least a portion of the color values and/or increase at least an additional portion of the color values using the average color values and the factor. For example, and for a point, the update component 124 may determine distances between the color values associated with the point and the average color value associated with the point and then multiply the distances by the factor. The update component 124 may then perform similar processes for one or more (e.g., each) of the other points associated with the portion of the frame.

Additionally, in some examples, since this further updating of the color values may cause one or more of the color values to fall outside of the range of color values, such as by being less than the set minimum color value (e.g., 0) or greater than the set maximum color value (e.g., 1.0), the update component 124 may further "clip" that color value (s). For example, the update component 124 may cause any color value that is less than the set minimum color value to include the set minimum color value and/or cause any color value that is greater than the set maximum color value to include the set maximum color value. This way, all of the color values associated with the color channels may fall within the range of color values.

Figure 7A:
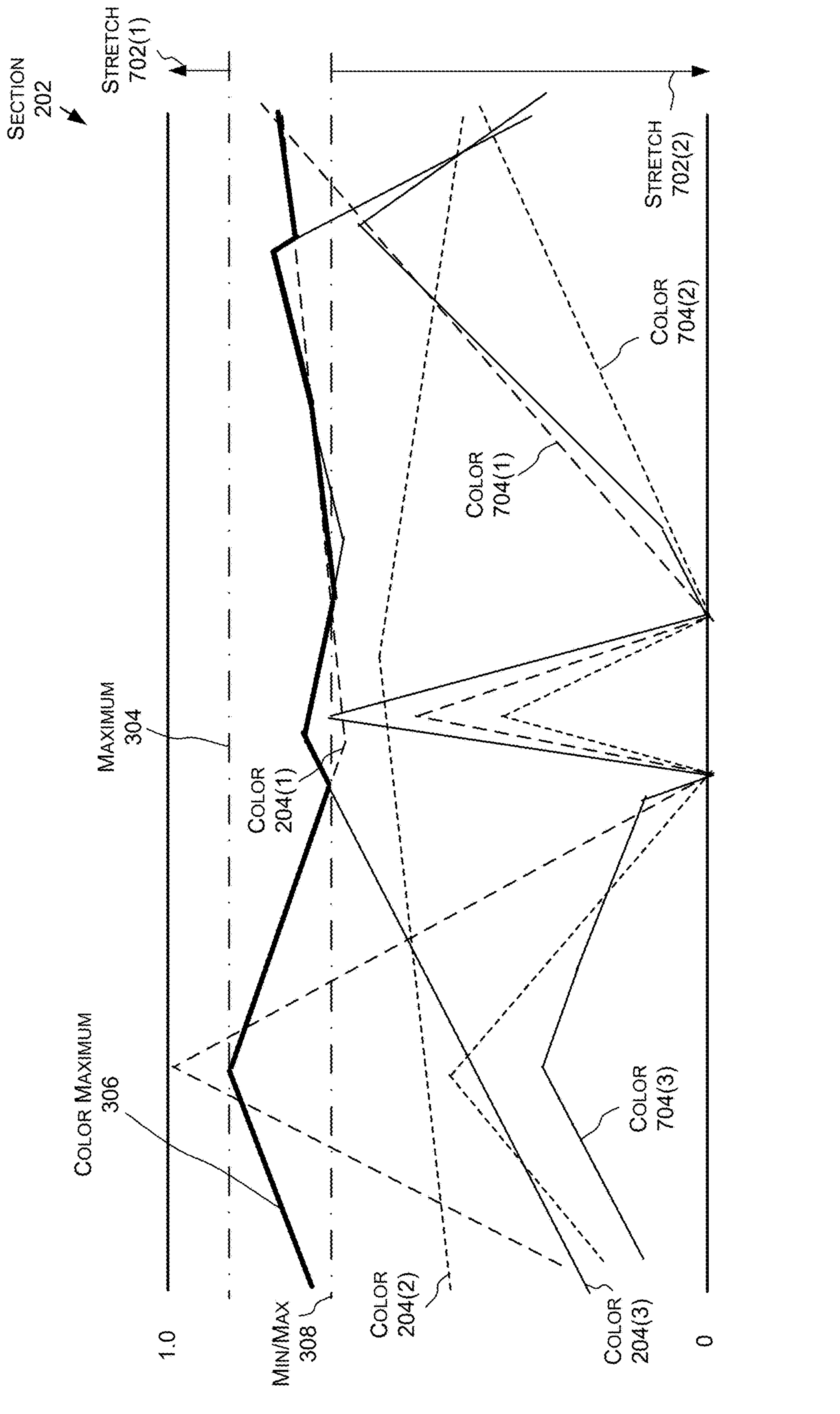
FIGS. 7A-7D illustrate an example of updating color values associated with a portion of a frame using a third technique, in accordance with some embodiments of the present disclosure.

For instance, FIGS. 7A-7D illustrate an example of updating color values associated with a portion of a frame using a third technique, in accordance with some embodiments of the present disclosure. As shown by the example of FIG. 7A, the update component 124 may perform a first stretch 702(1) associated with increasing the maximum color value 304 to include the set maximum color value of 1.0 and also perform a second stretch 702(2) associated with decreasing the min/max color value 308 to include the set minimum color value of 0. Additionally, based at least on performing the stretching 702(1)-(2), the update component 124 may update the color values 204(1) to determine updated color values 704(1) for the first color channel, update the color values 204(2) to determine updated color values 704(2) for the second color channel, and update the color values 204(3) to determine updated color values 704(3) for the third color channel. In some examples, the update component 124 may update the color values 204(1)-(3) similar to how the update component 124 updated the color values 204(1)-(3) with respect to the stretch 502(2) as illustrated by the example FIG. 5 and/or how the update component 124 updated the color values 504(1)-(3) with respect to the stretch 602 as illustrated by the example of FIG. 6 (e.g., maintaining the ratios).

Figure 7B:
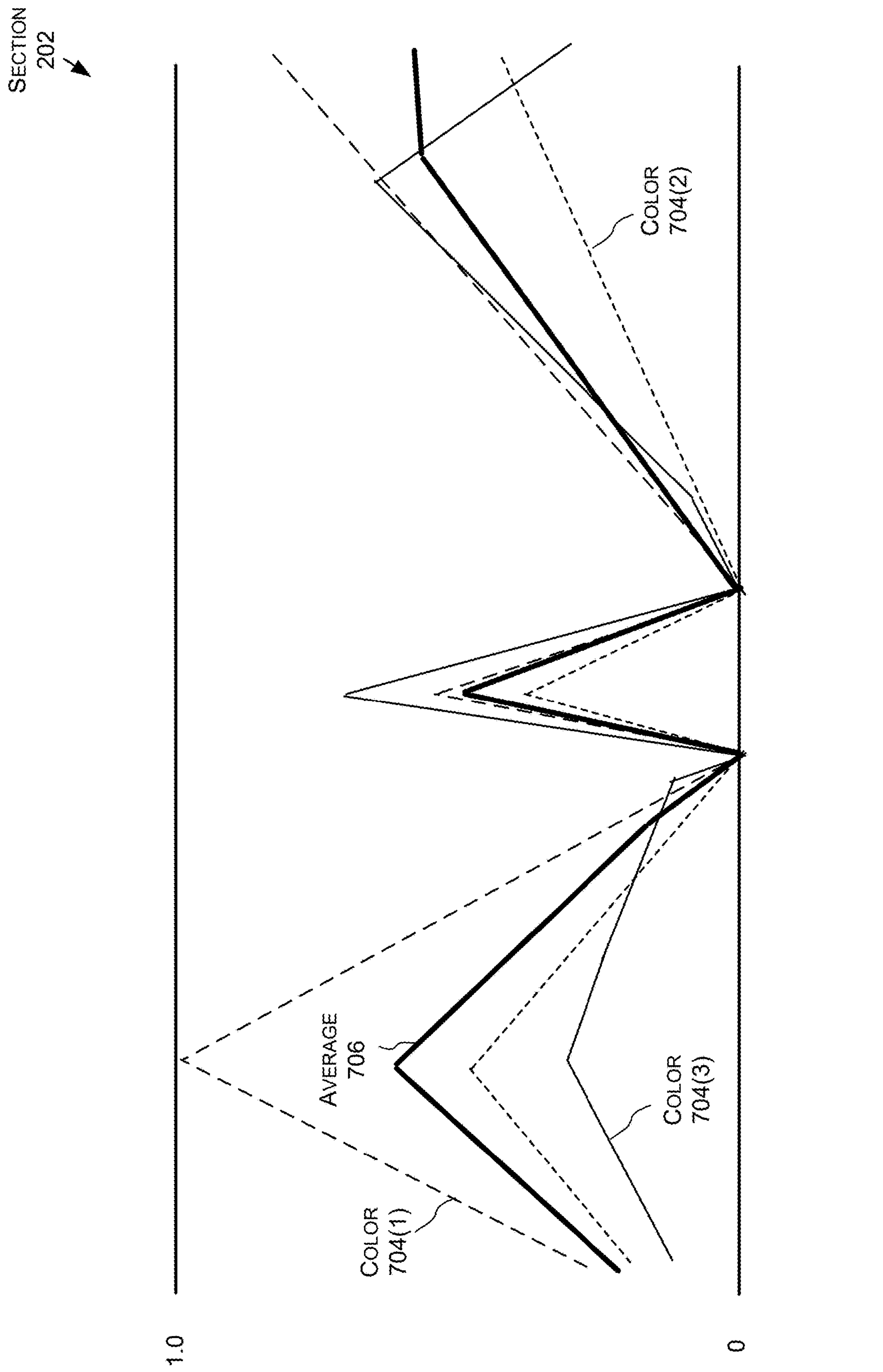

Next, and as illustrated by the example of FIG. 7B, the update component 124 may determine average color values 706 associated with the color values 704(1)-(3). As described herein, in some examples, when determining the average color values 706, the update component 124 may use one or more weights associated with one or more of the color channels. For instance, the update component 124 may use a first weight associated with the first color channel, a second weight associated with the second color channel, and a third weight associated with the third color channel. Additionally, a weight may include, but is not limited to, 10%, 25%, 50%, 70%, 90%, and/or any other percentage. For example, the update component 124 may use a first weight of 25% for the red color channel, a second weight of 5% for the green color channel, and a third weight of 70% for the blue color channel. However, in other examples, the update component 124 may use any other weights associated with the color channels.

Figure 7C:
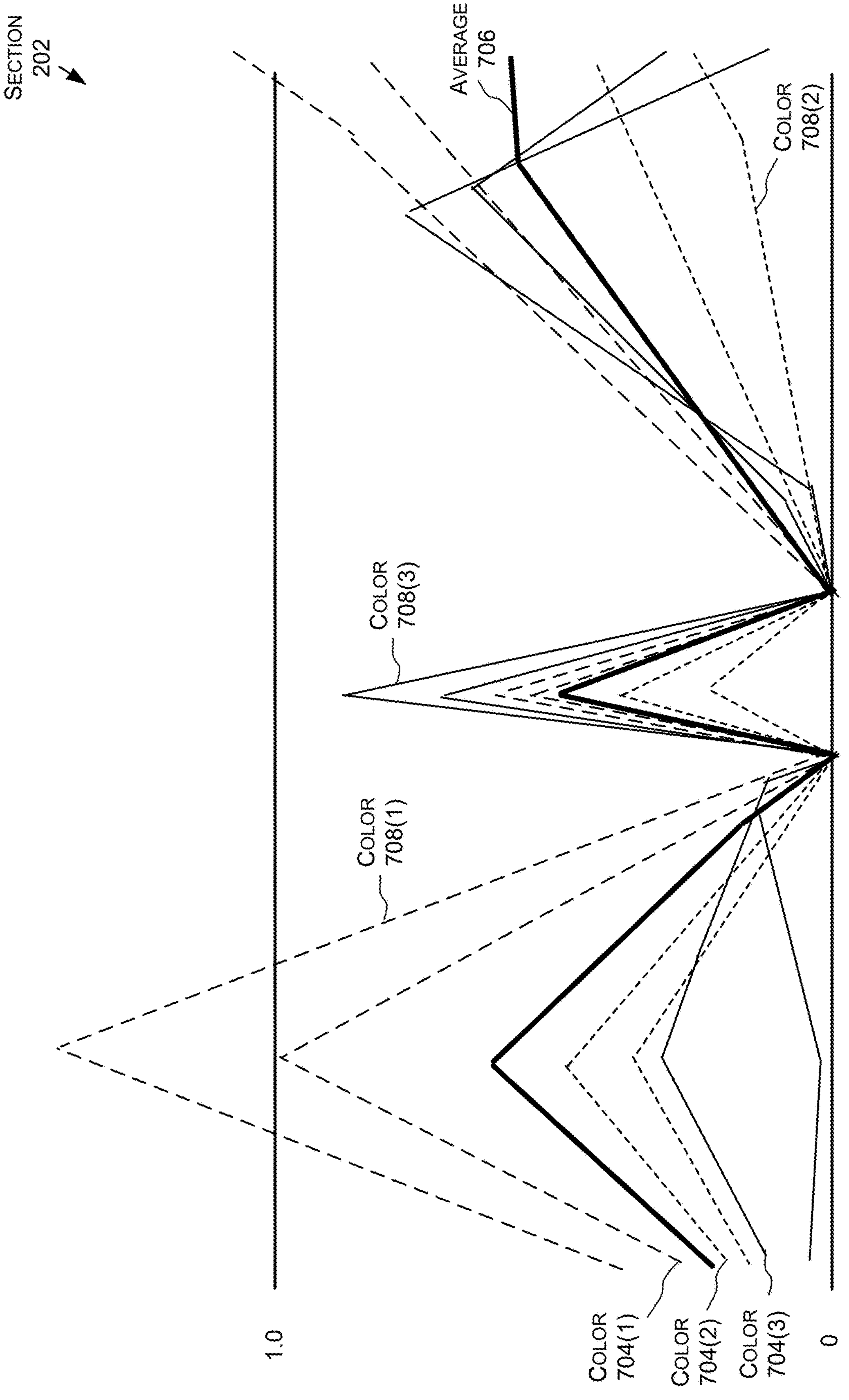

Next, and as illustrated by the example of FIG. 7C, the update component 124 may use the color values 704(1)-(3), the average color values 706, and a factor to determine updated color values 708(1)-(3). In the example of FIG. 7C, the update component 124 may use a factor of 2. However, in other examples, the update component 124 may use any other factor. As shown, by using the average color values 706 and applying the factor, the update component 124 may update the color values 704(1) to determine the updated color values 708(1) for the first color channel, update the color values 704(2) to determine the updated color values 708(2) for the second color channel, and update the color values 704(3) to determine the updated color values 708(3) for the third color channel. By using the factor of 2, the updated color values 708(1)-(3) may be twice as far from the average color values 706 as compared to the color values 704(1)-(3).

Figure 7D:
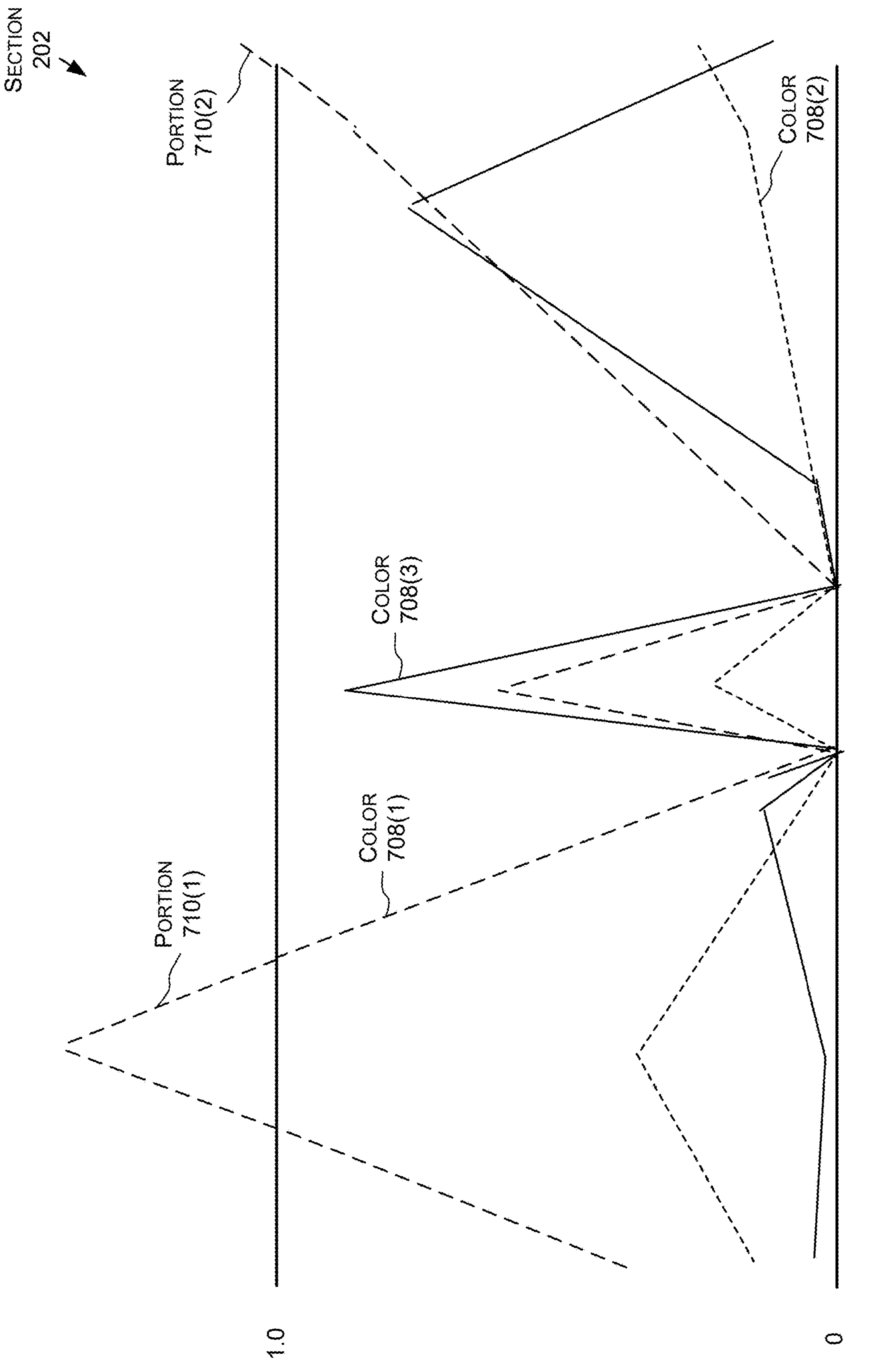

Next, and as illustrated by the example of FIG. 7D, the update component 124 may then clip portions of the color values 708(1)-(3) that fall outside of the range of color values associated with the color channels. For instance, and as shown, the update component 124 may reduce a first portion 710(1) of the color values 708(1) that are greater than the set maximum color value such that the first portion 710(1) of the color values 708(1) includes the set maximum color value. The update component 124 may also reduce a second portion 710(2) of the color values 708(2) that are also greater than the set maximum color value such that the second portion 710(2) of the color values 708(1) also includes the set maximum color value. By performing such processes, the update component 124 may cause the color values 708(1)-(3) to remain within the range of color values.

Referring back to the example of FIG. 1, in some examples and for the frame, the process 100 may continue to be repeated for any number of portions of the frame in order to continue updating additional color values for the frame. Additionally, in some examples, the process 100 may continue to be repeated in order to update color values associated with one or more additional frames. The process 100 may then include generating and/or outputting updated image data 130 representing one or more of the frames as updated with the updated color values. As described herein, the application server(s) may then provide the updated image data 130 to the client device(s) and/or the client device(s) may use the updated image data 130 to display the updated frame(s).

As described herein, in some examples, at least a portion of the process 100 may be performed by the application server(s) 1102 and/or at least a portion of the process 100 may be performed by the client device 1104. For instance, the application server(s) 1102 may include and/or be executing the color component 102, the min/max component 114, and/or the update component 124, and/or the client device 1104 may include and/or be executing the color component 102, the min/max component 114, and/or the update component 124. For instance, the application server(s) 1102 and/or the client device 1104 may be executing at least a portion of this process 100 during a session associated with the application that is between the application server(s) 1102 and the client device 1104, where the process 100 is performed in order to enhance the visual characteristics associated with the frames being displayed by the client device 1104.

Figure 8:
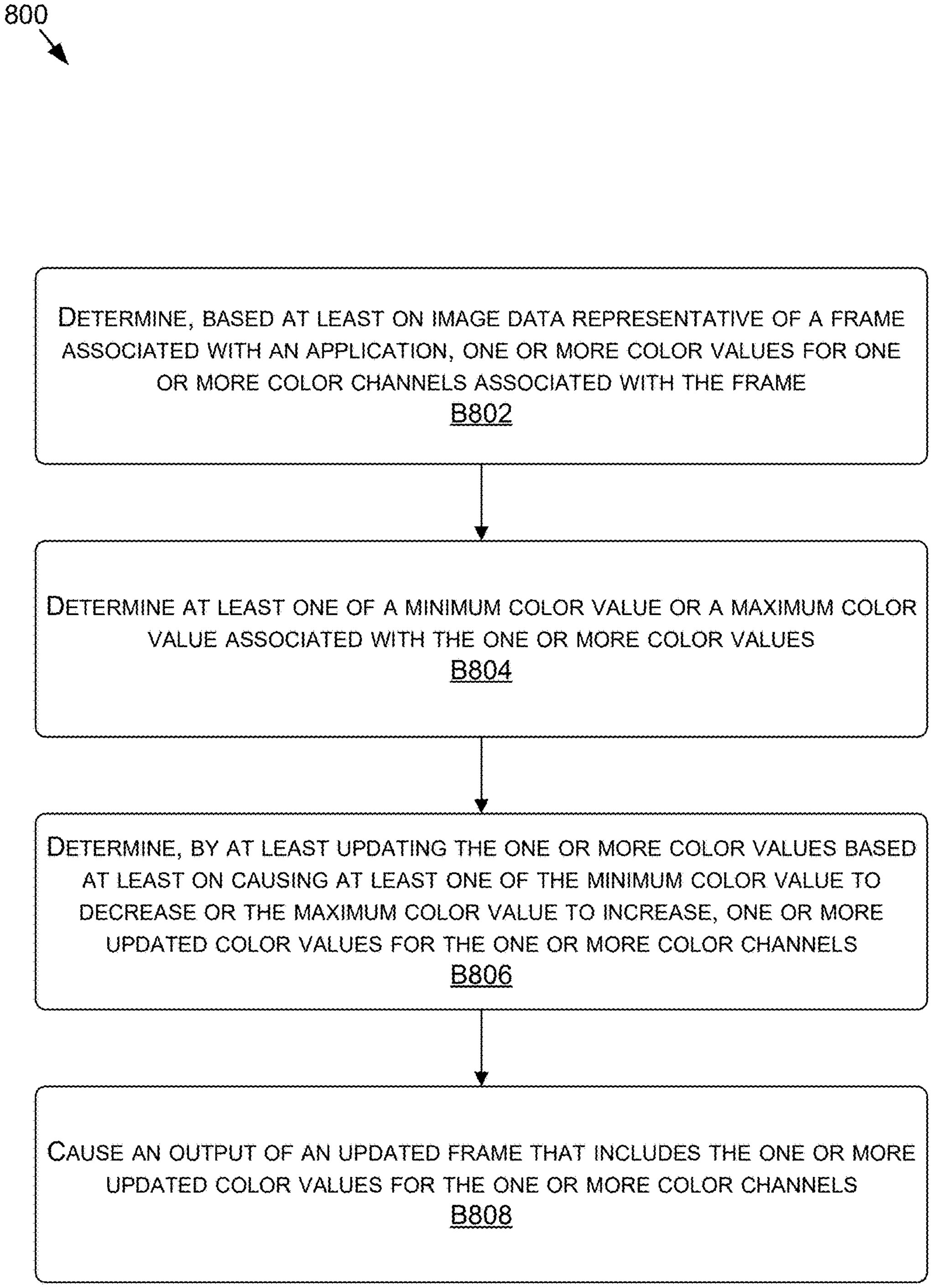
FIGS. 8-10 illustrate flow diagrams showing methods for updating a frame using various techniques, in accordance with some embodiments of the present disclosure.
Figure 9:
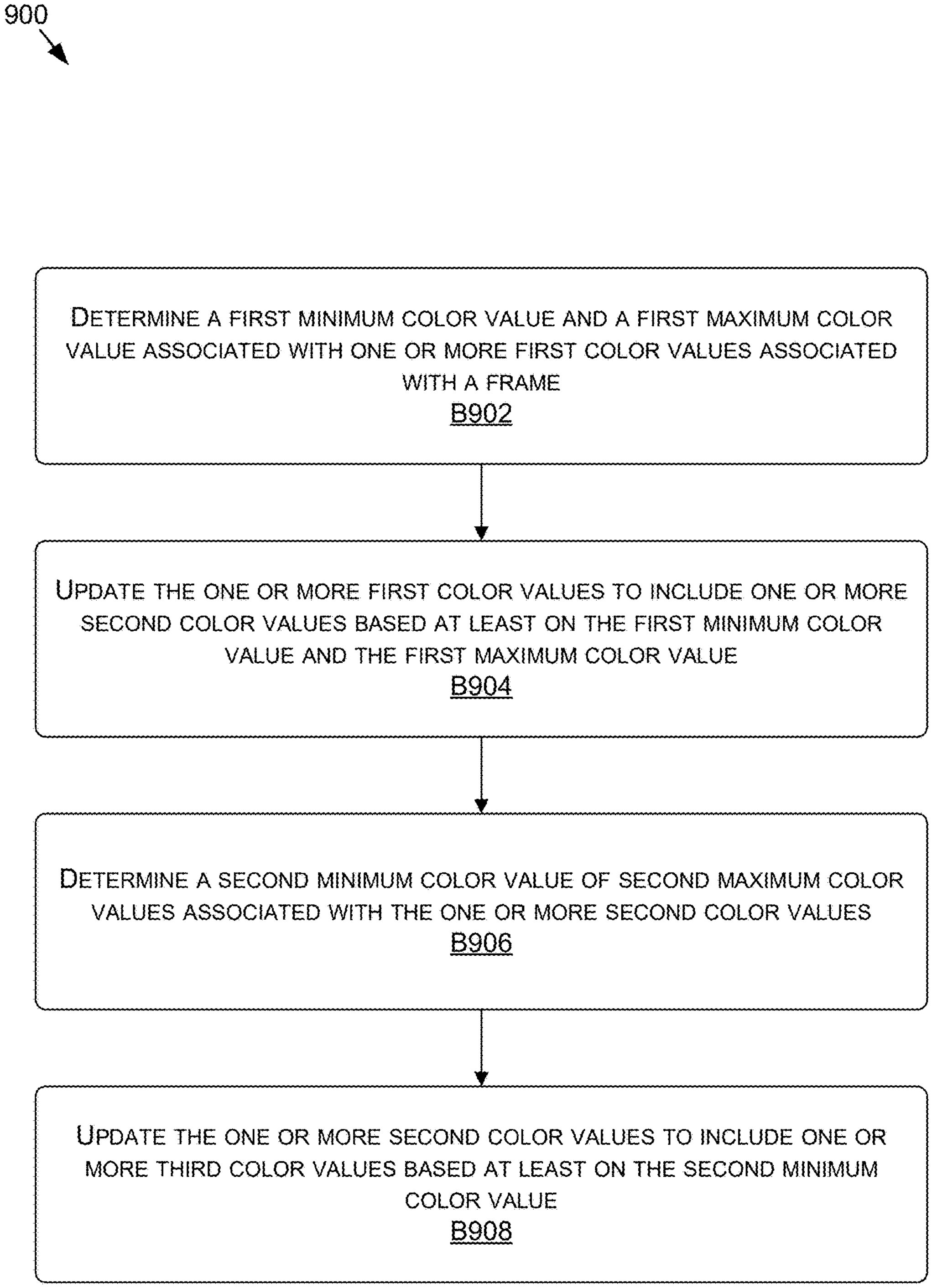
Figure 10:
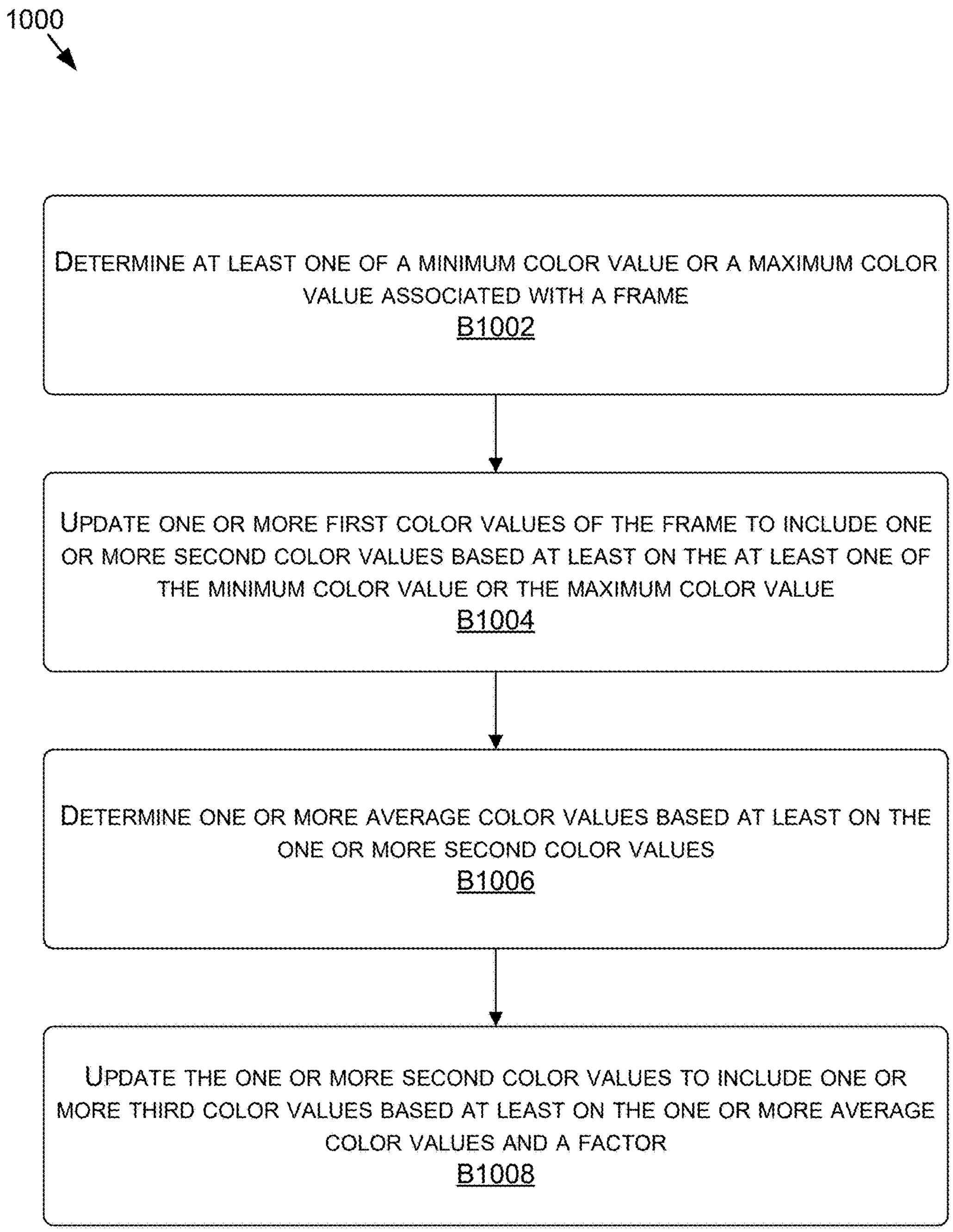

Now referring to FIGS. 8-10, each block of methods 800, 900, and 1000, described herein, comprises a computing process that may be performed using any combination of hardware, firmware, and/or software. For instance, various functions may be carried out by a processor executing instructions stored in memory. The methods 800, 900, and 1000 may also be embodied as computer-usable instructions stored on computer storage media. The methods 800, 900, and 1000 may be provided by a standalone application, a service or hosted service (standalone or in combination with another hosted service), or a plug-in to another product, to name a few. In addition, the methods 800, 900, and 1000 are described, by way of example, with respect to FIG. 1. However, these methods 800, 900, and 1000 may additionally or alternatively be executed by any one system, or any combination of systems, including, but not limited to, those described herein.

FIG. 8 illustrate a flow diagram showing a method 800 for updating a frame using a first technique, in accordance with some embodiments of the present disclosure. The method 800, at block B802, may include determining, based at least on image data representative of a frame associated with an application, one or more color values for one or more color channels associated with the frame. For instance, the color component 102 may receive the image data 104 representative of the frame. The color component 102 may then process the image data 104 in order to determine the color value(s) for the color channel(s). As described herein, the color value(s) may include one or more red color values 108, one or more green color values 110, and/or one or more blue color values 112 for one or more points (e.g., pixels) of the frame.

The method 800, at block B804, may include determining at least a minimum color value or a maximum color value associated with the one or more color values. For instance, the min/max component 114 may determine at least one of the minimum color value 118 associated with the point, the maximum color value 120 associated with the point, the maximum color values 120 associated with multiple points, and/or the min/max color value 122. As described herein, in some examples, the min/max component 114 may determine these minimum and/or maximum color values based at least on processing the color value(s) associated with the frame. Additionally, or alternatively, in some examples, the min/max component 114 may determine these minimum and/or maximum color values as one or more local minimum color values and/or one or more local maximum color values based at least on processing the frame using sampling.

The method 800, at block B806, may include determining, by at least updating the one or more color values based at least on causing at least one of the minimum color value to decrease or the maximum color value to increase, one or more updated color values for the one or more color channels. For instance, the update component 124 may determine the updated color value(s) based at least on stretching the color value(s) by decreasing the minimum color value and/or increasing the maximum color value. In some examples, the update component 124 may determine the updated color value(s) using additional processing. For a first example, the update component 124 may further update the color value(s) based at least on further stretching the color value(s) by reducing the min/max color value 122. For a second example, the update component 124 may determine an average color value(s) associated with the color value(s) after stretching and then use the average color value(s) and a factor to further update the color value(s).

The method 800, at block B808, may include causing an output for an updated frame that includes the one or more updated color values for the one or more color channels. For instance, the update component 124 may use the updated color value(s) to generate the updated frame represented by the updated image data 130. The application server(s) may then send the updated image data 130 to the client device for displaying the updated frame, if the application server(s) performed these processes of updating the frame, or the client device may just use the updated image data 130 to display the updated frame, if the client device performed these processes of updating the frame.

FIG. 9 illustrate a flow diagram showing a method 900 for updating a frame using a second technique, in accordance with some embodiments of the present disclosure. For instance, the method 900, at block B902, may include determining a first minimum color value and a first maximum color value associated with one or more first color values associated with a frame. For instance, the min/max component 114 may determine the first minimum color value 118 and the first maximum color value 120 associated with the first color value(s). As described herein, in some examples, the min/max component 114 may determine the first minimum color value 118 and/or the first maximum color value 120 based at least on processing the color value(s) associated with the frame. Additionally, or alternatively, in some examples, the min/max component 114 may determine the first minimum color value 118 and/or the first maximum color value 120 as a local minimum color value and/or a local maximum color value based at least on processing the frame using sampling.

The method 900, at block B904, may include updating the one or more first color values to include one or more second color values based at least on the first minimum color value and the first maximum color value. For instance, the update component 124 may update the first color value(s) using the first minimum color value 118 and the first maximum color value 120 to determine the second color value(s). In some examples, and as described herein, the update component 124 may perform the updating by decreasing the first minimum color value 118, such as to include the set minimum color value, and increasing the first maximum color value 120, such as to include the set maximum color value. For instance, at least a portion of the first color value(s) may decrease and/or at least a portion of the first color value(s) may increase to determine the second color value(s).

The method 900, at block B906, may include determining a second minimum color value of second maximum color values associated with the one or more second color values. For instance, the min/max component 114 may determine the maximum color values 120 for multiple of the points associated with the second color value(s). The min/max component 114 may then determine the min/max color value 122 as the minimum of the second maximum color values 120.

The method 900, at block B908, may include updating the one or more second color values to include one or more third color values based at least on the second minimum color value. For instance, the update component 124 may update the second color value(s) using the min/max color value 122 to determine the third color value(s). In some examples, and as described herein, the min/max component 114 may determine one or more factors using the second maximum color values 120 and the min/max color value 122 and then use the second color value(s) and the factor(s) to determine the third color value(s). As such, the update component 124 may maintain one or more ratio between the second color value(s) when performing this second update.

FIG. 10 illustrate a flow diagram showing a method 100 for updating a frame using a third technique, in accordance with some embodiments of the present disclosure. The method 1000, at block B1002, may include determining at least one of a minimum color value or a maximum color value associated with a frame. For instance, the min/max component 114 may determine at least the maximum color value 120 associated with points of the frame, the maximum color values 120 associated with the points, and/or the min/max color value 122. As described herein, in some examples, the min/max component 114 may determine these minimum and/or maximum color values based at least on processing the color value(s) associated with the frame. Additionally, or alternatively, in some examples, the min/max component 114 may determine these minimum and/or maximum color values as one or more local minimum color values and/or one or more local maximum color values based at least on processing the frame using sampling.

The method 1000, at block B1004, may include updating one or more first color values of the frame to include one or more second color values based at least on the at least one of the minimum color value and the maximum color value. For instance, the update component 124 may update the first color value(s) based at least on increasing the maximum color value 120, such as to a set maximum color value, and/or decreasing the min/max color value 122, such as to a set minimum color value. In some examples, the updating of the first color value(s) includes increasing at least a first portion of the first color value(s) and/or decreasing at least a second portion of the first color value(s). In some examples, one or more ratios of the first color value(s) are maintained after performing this updating.

The method 1000, at block B1006, may include determining one or more average color values based at least on the one or more second color values. For instance, the update component 124 may determine the average color value(s) based at least on the second color value(s). As described herein, in some examples, when determining the average color value(s), the update component 124 may use one or more weights associated with one or more of the color channels. For instance, the update component 124 may use a first weight associated with the red color channel, a second weight associated with the green color channel, and/or a third weight associated with the blue color channel.

The method 1000, at block B1008, may include updating the one or more second color values to include one or more third color values based at least on the one or more average color values and a factor. For instance, the update component 124 may then further update the second color value(s) based at least on the average color value(s) and the factor. As described herein, in some examples, the update component 124 may update the second color value(s) by multiplying one or more distances between the second color value(s) and the average color value(s) by the factor.

Example Content Streaming System

Figure 11:
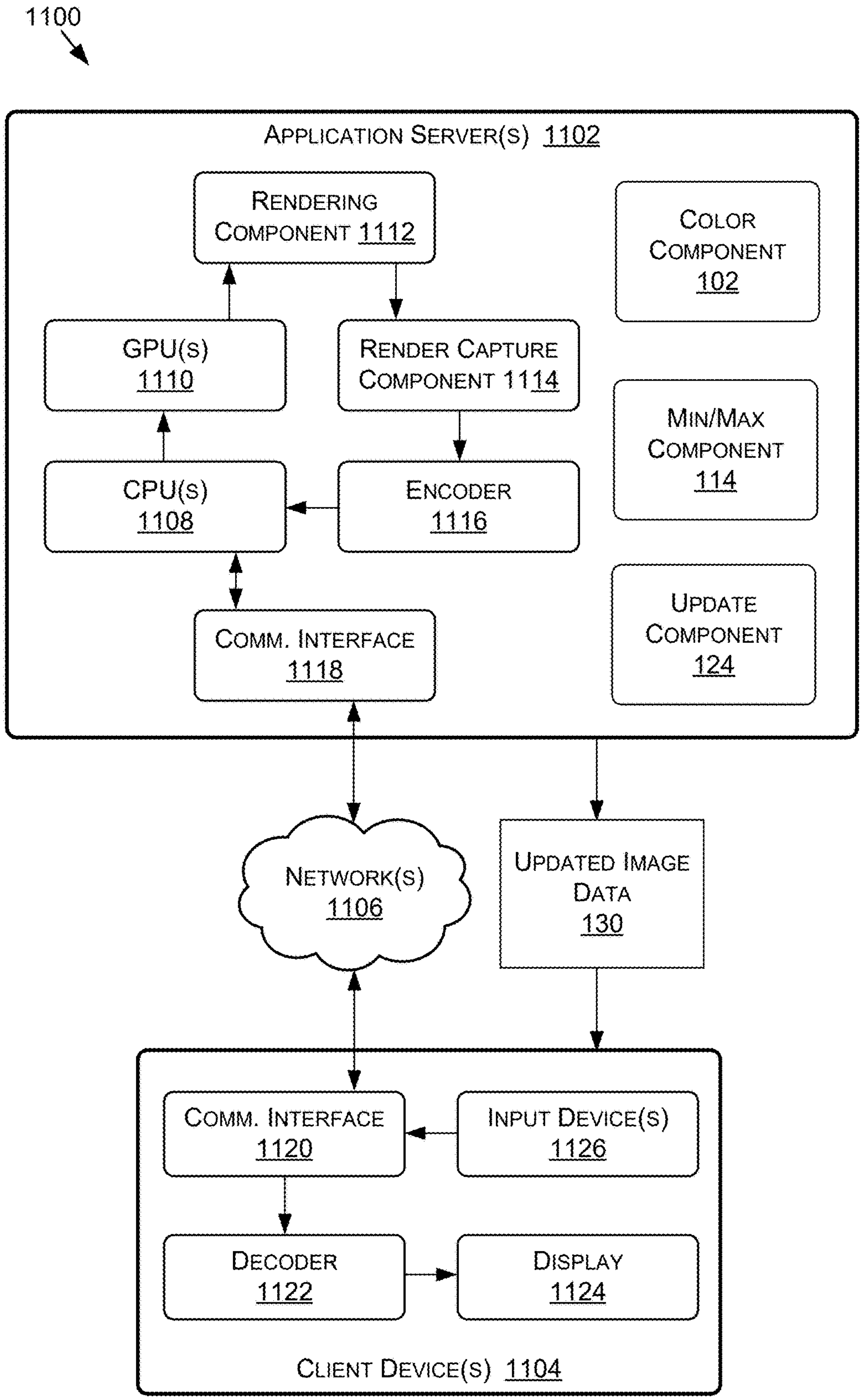
FIG. 11 is a block diagram of an example content streaming system suitable for use in implementing some embodiments of the present disclosure.

Now referring to FIG. 11, FIG. 11 is an example system diagram for a content streaming system 1100, in accordance with some embodiments of the present disclosure. FIG. 11 includes application server(s) 1102 (which may include similar components, features, and/or functionality to the example computing device 1200 of FIG. 12), client device(s) 1104 (which may include similar components, features, and/or functionality to the example computing device 1200 of FIG. 12), and network(s) 1106 (which may be similar to the network(s) described herein). In some embodiments of the present disclosure, the system 1100 may be implemented. The application session may correspond to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 1100, for an application session, the client device(s) 1104 may only receive input data in response to inputs to the input device(s), transmit the input data to the application server(s) 1102, receive encoded display data from the application server(s) 1102, and display the display data on the display 1124. As such, the more computationally intense computing and processing is offloaded to the application server(s) 1102 (e.g., rendering—in particular ray or path tracing—for graphical output of the application session is executed by the GPU(s) of the game server(s) 1102). In other words, the application session is streamed to the client device(s) 1104 from the application server(s) 1102, thereby reducing the requirements of the client device(s) 1104 for graphics processing and rendering.

For example, with respect to an instantiation of an application session, a client device 1104 may be displaying a frame of the application session on the display 1124 based on receiving the display data from the application server(s) 1102. The client device 1104 may receive an input to one of the input device(s) and generate input data in response. The client device 1104 may transmit the input data to the application server(s) 1102 via the communication interface 1120 and over the network(s) 1106 (e.g., the Internet), and the application server(s) 1102 may receive the input data via the communication interface 1118. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 1112 may render the application session (e.g., representative of the result of the input data) and the render capture component 1114 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 1102. In some embodiments, one or more virtual machines (VMs)—e.g., including one or more virtual components, such as vGPUs, vCPUs, etc.—may be used by the application server(s) 1102 to support the application sessions. The encoder 1116 may then encode the display data to generate encoded display data and the encoded display data may be transmitted to the client device 1104 over the network(s) 1106 via the communication interface 1118. The client device 1104 may receive the encoded display data via the communication interface 1120 and the decoder 1122 may decode the encoded display data to generate the display data. The client device 1104 may then display the display data via the display 1124.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

As further illustrated in the example of FIG. 11, the application server(s) 1102 may include the color component 102, the min/max component 114, and/or the update component 124. As such, the application server(s) 1102 may be configured to perform at least a portion of the process 100 from FIG. 1. Additionally, and as also shown, after generating the updated image data 130, the application server(s) 1102 may send the updated image data 1102 to the client device(s) 1104 so that the client device(s) 1104 is able to display one or more of the frames represented by the updated image data 130. While the example of FIG. 11 illustrates the application server(s) 1102 as including the color component 102, the min/max component 114, and/or the update component 124, in other examples, the client device(s) 1104 may include one or more of the color component 102, the min/max component 114, and/or the update component 124. In such examples, the application server(s) 1102 may send the image data 104 to the client device(s) 1104 for processing.

Example Computing Device

Figure 12:
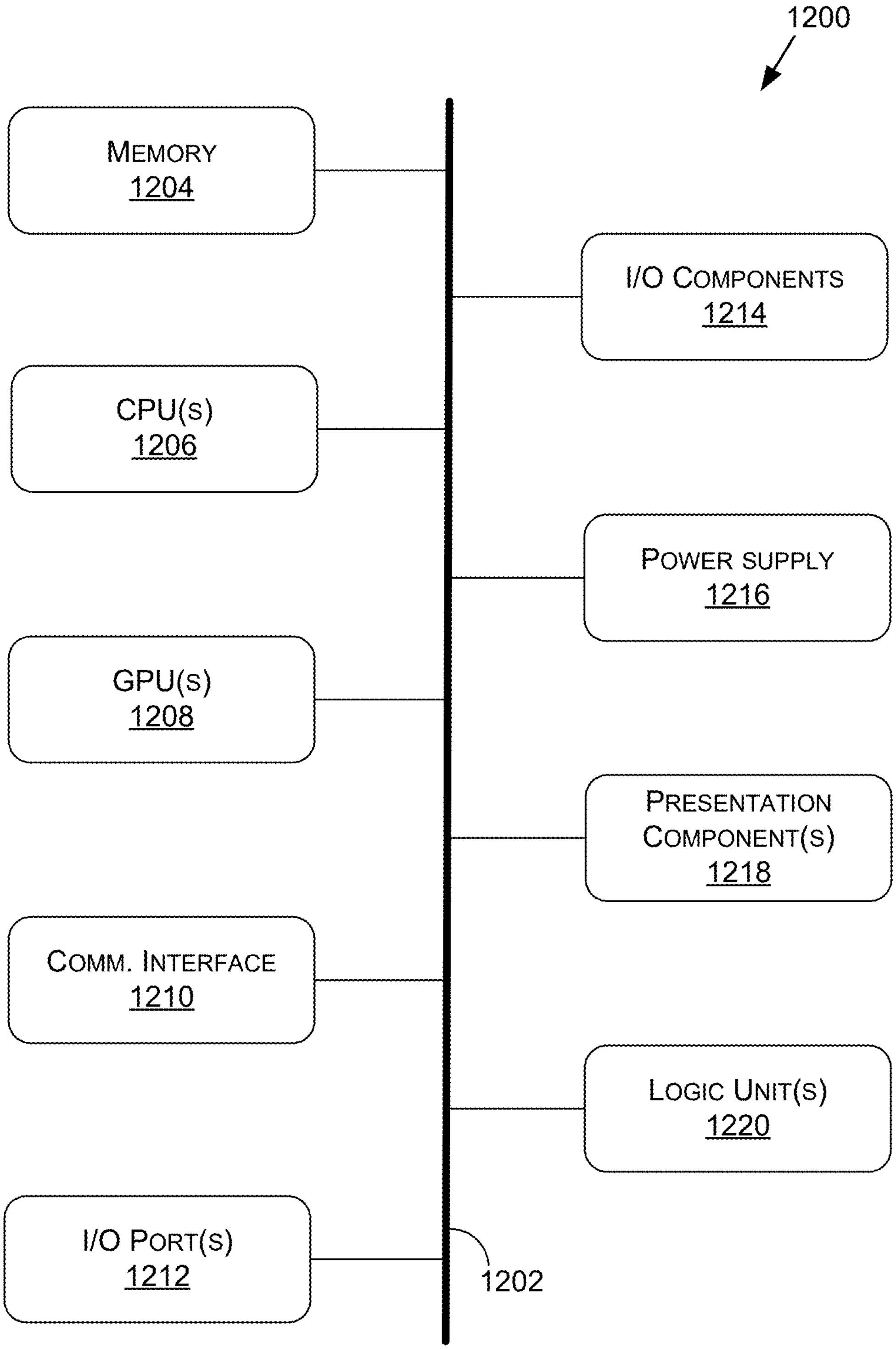
FIG. 12 is a block diagram of an example computing device suitable for use in implementing some embodiments of the present disclosure.

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM) processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1220 and/or communication interface 1210 may include one or more data processing units (DPUs) to transmit data received over a network and/or through interconnect system 1202 directly to (e.g., a memory of) one or more GPU(s) 1208.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, DPUs, etc.), and output the data (e.g., as an image, video, sound, etc.).

Example Data Center

Figure 13:
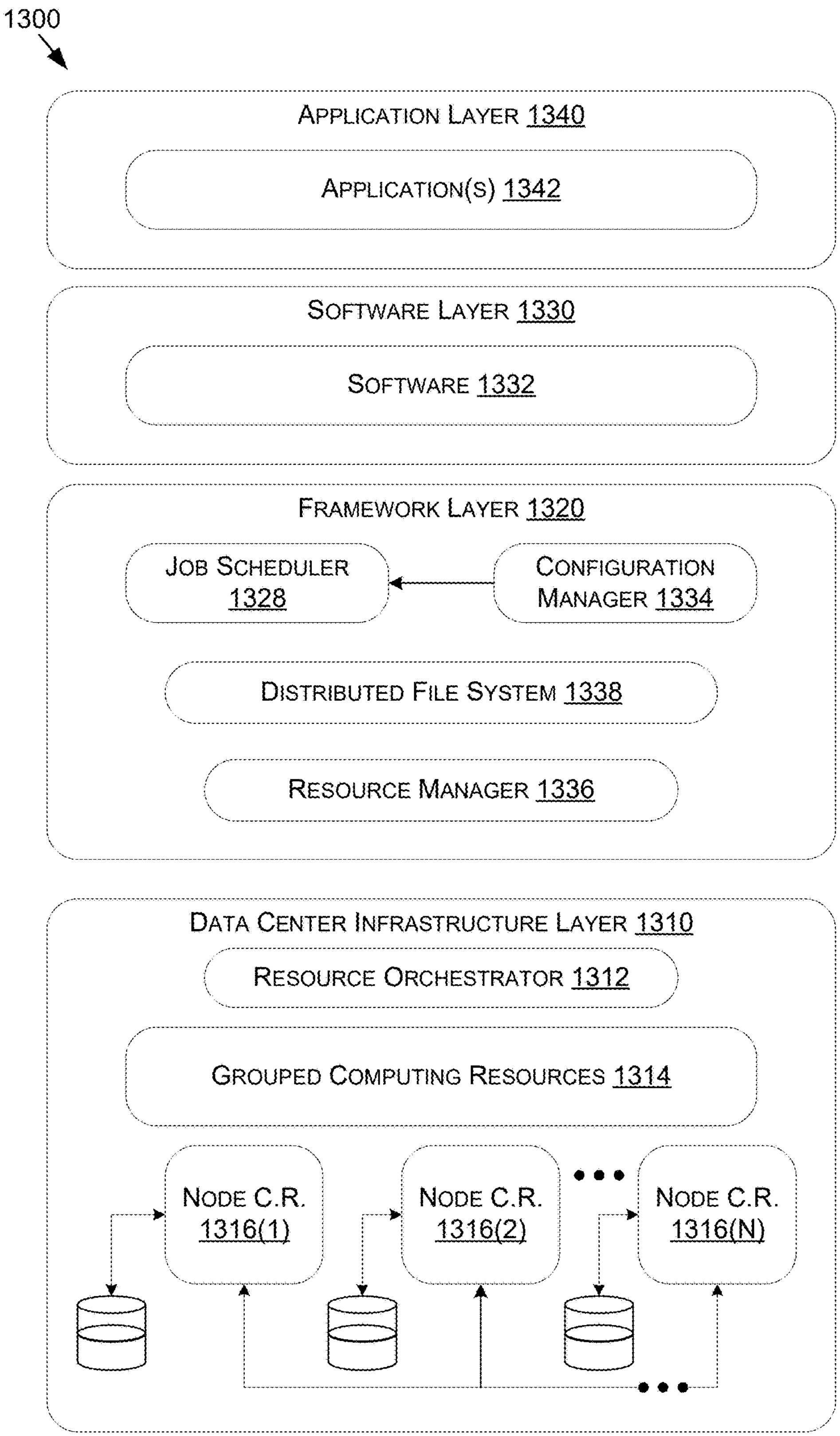
FIG. 13 is a block diagram of an example data center suitable for use in implementing some embodiments of the present disclosure.

FIG. 13 illustrates an example data center 1300 that may be used in at least one embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161 (N) may include one or more virtual components, such as vGPUs, vCPUs, and/or the like, and/or one or more of the node C.R.s 1316(1)-1316(N) may correspond to a virtual machine (VM).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s 1316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1312 may configure or otherwise control one or more node C.R.s 1316(1)-1316(N) and/or grouped computing resources 1314. In at least one embodiment, resource orchestrator 1312 may include a software design infrastructure (SDI) management entity for the data center 1300. The resource orchestrator 1312 may include hardware, software, or some combination thereof.

In at least one embodiment, as shown in FIG. 13, framework layer 1320 may include a job scheduler 1328, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1328 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1328. In at least one embodiment, clustered or grouped computing resources may include grouped computing resource 1314 at data center infrastructure layer 1310. The resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316 (1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., “big data”).

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of “and/or” with respect to two or more elements should be interpreted to mean only one element, or a combination of elements. For example, “element A, element B, and/or element C” may include only element A, only element B, only element C, element A and element B, element A and element C, element B and element C, or elements A, B, and C. In addition, “at least one of element A or element B” may include at least one of element A, at least one of element B, or at least one of element A and at least one of element B. Further, “at least one of element A and element B” may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

Example Paragraphs

A: A system comprising: one or more processors to: determine, based at least on first image data representative of a frame associated with an application, one or more first color values for one or more color channels associated with the frame; determine, based at least on at least one of decreasing a first portion of the one or more first color values using a minimum color value or increasing a second portion of the one or more first color values using a maximum color value, one or more second color values for the one or more color channels, wherein determination of the one or more second color values comprises: performing one or more downsampling iterations and one or more upsampling iterations associated with the frame to obtain the maximum color value; and generate second image data representative of an updated frame associated with the one or more second color values.

B: The system of paragraph A, wherein obtaining the maximum color value comprises: generating one or more second frames by performing the downsampling iterations on the frame; generating one or more third frames by performing the upsampling iterations on the one or more second frames; and determining the maximum color value based at least on the one or more third frames.

C: The system of either paragraph A or paragraph B, wherein the one or more processors are further to: determine a second minimum color value associated with the one or more second color values; and determine, based at least on decreasing at least a portion of the one or more second color values using the second minimum color value, one or more third color values for the one or more color channels, wherein the updated frame is associated with the one or more third color values for the one or more color channels.

D: The system of any one of paragraphs A-C, wherein the one or more processors are further to: determine one or more average color values associated with the one or more second color values; and determine, based at least on updating the one or more second color values using the one or more average color values, one or more third color values for the one or more color channels, wherein the updated frame is associated with the one or more third color values for the one or more color channels.

E: The system of any one of paragraphs A-D, wherein the one or more first color values are associated with one or more first pixels of the frame, and wherein the one or more processors are further to: determine, based at least on the image data representative of the frame, one or more third color values for the one or more color channels associated with the frame, the one or more third color values associated with one or more second pixels of the frame; and determine, based at least on at least one of decreasing a first portion of the one or more third color values using a second minimum color or increasing a second portion of the one or more third color values using a second maximum color value, one or more fourth color values for the one or more color channels.

F: The system of any one of paragraphs A-E, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

G: A method comprising: determining, based at least on image data representative of a frame associated with an visual application, one or more color values for one or more color channels associated with the frame; determining, by performing a plurality of resampling iterations on the frame, an upper bound color value associated with the one or more color values; determining, by at least updating the one or more color values based at least on at least one of decreasing a lower bound color value or increasing the upper bound color value, one or more updated color values for the one or more color channels; and updating the frame with the one or more updated color values for the one or more color channels.

H: The method of paragraph G, wherein the determining the upper bound color value associated with the one or more color values comprises: generating one or more second frames by performing at least one downsampling iteration on the frame; generating one or more third frames by performing at least one upsampling iteration on the one or more second frames; and determining the upper bound color value based at least on the one or more third frames.

I: The method of paragraph H, wherein the determining the upper bound color value is further based at least on processing the one or more third frames using at least one of dilation or one or more filters.

J: The method of any one of paragraphs G-I, wherein: the one or more color values for the one or more color channels comprise one or more of: one or more first color values for a red color channel associated with one or more pixels of the frame; one or more second color values for a green color channel associated with the one or more pixels; of one or more third color values for a blue color channel associated with the one or more pixels.

K: The method of any one of paragraphs G-J, wherein the one or more color values are associated with one or more first pixels of the frame, and wherein the method further comprises: determining, based at least on the image data representative of the frame, one or more second color values for the one or more color channels associated with the frame, the one or more second color values associated with one or more second pixels of the frame; determining at least one of a second lower bound color value or a second upper bound color value associated with the one or more second color values; and determining, by at least updating the one or more second color values based at least on at least one of decreasing the second lower bound color value or increasing the second upper bound color value, one or more updated second color values for the one or more color channels.

L: The method of any one of paragraphs G-K, wherein the determining the one or more updated color values for the one or more color channels comprises at least one of: determining, by at least decreasing at least a first portion of the one or more color values based at least on the lower bound color value including a set lower bound color value associated with the one or more color channels, at least a first portion of the one or more updated color values for the one or more color channels; or determining, by at least increasing at least a second portion of the one or more color values based at least on the upper bound color value including a set upper bound color value associated with the one or more color channels, at least a second portion of the one or more updated color values for the one or more color channels.

M: The method of any one of paragraphs G-L, further comprising: determining a second lower bound color value based at least on the one or more updated color values for the one or more color channels; and determining, by at least updating the one or more updated color values based at least on decreasing the second lower bound color value, one or more second updated color values for the one or more color channels, wherein the updated frame is associated with the one or more second updated color values for the one or more color channels.

N: The method of paragraph M, wherein the determining the second lower bound color value comprises: determining, based at least on the one or more updated color values, one or more second upper bound color values associated with one or more pixels of the frame; and determining that the second lower bound color value includes a minimum of the one or more second lower bound color values.

O: The method of paragraph M, wherein the determining the one or more second updated color values for the one or more color channels comprises: determining, based at least on decreasing the second lower bound color value, one or more factors; and determining the one or more second updated color values by multiplying the one or more updated color values by the one or more factors.

P: The method of paragraph M, wherein: the one or more updated color values are associated with one or more ratios between the one or more color channels; and the one or more second updated color values are also associated with the one or more ratios between the one or more color channels.

Q: The method of any one of paragraphs G-P, further comprising: determining, based at least on the one or more updated color values, one or more average color values for the one or more color channels; and determining, by at least updating the one or more updated color values based at least on the one or more average color values, one or more second updated color values for the one or more color channels, wherein the updated frame is associated with the one or more second updated color values for the one or more color channels.

R: The method of paragraph Q, further comprising: determining at least one of a first weight associated with a red color channel of the one or more color channels, a second weight associated with a green color channel of the one or more color channels, or a third weight associated with a blue color channel of the one or more color channels, wherein the determining the one or more average color values is further based at least on the at least one of the first weight, the second weight, or the third weight.

S: One or more processors comprising: processing circuitry to perform a plurality of resampling iterations on a frame associated with an application to obtain a first extreme color value associated with the frame, and to output data representative of the frame having one or more color values associated with the frame updated based on at least one of increasing the first extreme color value or decreasing a second extreme color value associated with the frame.

T: The one or more processors of paragraph S, wherein the one or more processors are comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center, or a system implemented at least partially using cloud computing resources.

What is claimed is:

1. A system comprising:

one or more processors to:

determine, based at least on first image data representative of a frame associated with an application, first color values for color channels of pixels of the frame;

determine, based at least on the first color values, maximum color values for the pixels;

determine at least a first maximum color value for a first pixel of the pixels as including a minimum of the maximum color values and a second maximum color value for a second pixel of the pixels as including a maximum of the maximum color values;

determine, by decreasing a first portion of the first color values based at least on causing the first maximum color value to include a set minimum color value and increasing a second portion of the first color values based at least on causing the second maximum color value to include a set maximum color value, second color values for the pixels; and generate second image data representative of an updated frame associated with the second color values.

2. The system of claim 1, wherein the determination the maximum color values comprises:

generating one or more second frames by performing one or more downsizing iterations on the frame;

generating one or more third frames by performing one or more upsampling iterations on the one or more second frames; and determining the maximum color values based at least on the one or more third frames.

3. The system of claim 1, wherein:

the first portion of the first color values are closer to the first maximum color value than the second maximum color value; and the second portion of the first color values are closer to the second maximum color value than the first maximum color value.

4. The system of claim 1, wherein the one or more processors are further to:

determine one or more average color values associated with the second color values; and determine, based at least on updating the second color values using the one or more average color values, third color values for the pixels, wherein the updated frame is associated with the third color values.

5. The system of claim 1, wherein the pixels are associated with a first row of pixels of the frame, and wherein the one or more processors are further to:

determine, based at least on the first image data representative of the frame, third color values for the color channels of a second row of pixels of the frame; and determine, based on at least one of decreasing a first portion of the third color values or increasing a second portion of the third color values, fourth color values for the second row of pixels, wherein the updated frame is further associated with the fourth color values.

6. The system of claim 1, wherein the one or more processors are further to:

determine, using weights associated with the color channels, average color values associated with the second color values; and determine, based at least on updating the second color values using the average color values, third color values for the pixels, wherein the updated frame is associated with the third color values.

7. The system of claim 1, wherein the one or more processors are further to:

determine, based on at least one of increasing a first portion of the second color values that are less than the set minimum color value or decreasing a second portion of the second color values that are greater than the set maximum color value, third color values for the pixels, wherein the updated frame is associated with the third color values.

8. A method comprising:

determining, based at least on image data representative of a frame associated with a visual application, first color values for color channels of pixels of the frame;

determining, based at least on the first color values, maximum color values for the pixels;

determine at least a first maximum color value for a first pixel of the pixels as including a minimum of the maximum color values and a second maximum color value for a second pixel of the pixels as including a maximum of the maximum color values;

determining, by decreasing at least a first portion of the first color values based at least on causing the first maximum color value to include a set minimum color value and by increasing a second portion of the first color values based at least on causing the second maximum color value to include a set maximum color value, second color values for the pixels; and updating the frame based at least on the second color values.

9. The method of claim 8, further comprising:

generating one or more second frames by performing at least one downsampling iteration on the frame; and generating one or more third frames by performing at least one upsampling iteration on the one or more second frames, wherein the determining the maximum color values is based at least on the one or more third frames.

10. The method of claim 9, wherein the determining the maximum color values is further based at least on processing the one or more third frames using at least one of dilation or one or more filters.

11. The method of claim 8, wherein:

the color channels comprise one or more of:

a red color channel associated with the pixels of the frame;

a green color channel associated with the pixels; or a blue color channel associated with the pixels.

12. The method of claim 8, further comprising:

determining, based at least on the image data representative of the frame, third color values for the color channels of second pixels of the frame; and determining, based on at least one of decreasing a first portion of the third color values or increasing a second portion of the third color values, fourth color values for the pixels, wherein the updating the frame is further based at least on the fourth color values.

13. The method of claim 12, wherein the pixels of the frame are associated with a first row of pixels of the frame and the second pixels of the frame are associated with a second row of pixels of the frame.

14. The method of claim 8, wherein:

the first portion of the first color values are closer to the first maximum color value than the second maximum color value; and the second portion of the first color values are closer to the second maximum color value than the first maximum color value.

15. The method of claim 8, further comprising:

determining one or more average color values associated with the second color values; and determining, based at least on updating the second color values using the one or more average color values, third color values for the pixels, wherein the updating the frame is based at least on the third color values.

16. The method of claim 8, further comprising:

determining, using weights associated with the color channels, average color values associated with the second color values; and determining, based at least on updating the second color values using the average color values, third color values for the pixels, wherein the updating the frame is based at least on the third color values.

17. The method of claim 8, further comprising:

determining, based on at least one of increasing a first portion of the second color values that are less than the set minimum color value or decreasing a second portion of the second color values that are greater than the set maximum color value, third color values for the pixels, wherein the updating the frame is based at least on the third color values.

18. One or more processors comprising processing circuitry to:

determine, based at least on image data representative of a frame associated with an application, first color values for color channels of pixels of the frame;

determine, based at least on the first color values, maximum color values for the pixels;

determine at least a first maximum color value for a first pixel of the pixels as including a minimum of the maximum color values and a second maximum color value for a second pixel of the pixels as including a maximum of the maximum color values;

determine, by decreasing a first portion of the first color values based at least on causing the first maximum color value to include a set minimum color value and increasing a second portion of the first color values based at least on causing the second maximum color value to include a set maximum color value, second color values for the pixels; and update the frame to include an updated frame associated with the second color values.

19. The one or more processors of claim 18, wherein the processing circuitry is further to:

determine one or more average color values associated with the second color values; and determine, based at least on updating the second color values using the one or more average color values, third color values for the pixels, wherein the updated frame is associated with the third color values.

20. The one or more processors of claim 18, wherein the processing circuitry is further to:

determine, based on at least one of increasing a first portion of the second color values that are less than the set minimum color value or decreasing a second portion of the second color values that are greater than the set maximum color value, third color values for the pixels, wherein the updated frame is associated with the third color values.

* * * * *